United States Patent [19]
Sachs

[11] 3,981,087
[45] Sept. 21, 1976

[54] TEACHING MACHINE

[76] Inventor: Thomas D. Sachs, 34 S. Williams St., Burlington, Vt. 05401

[22] Filed: June 23, 1975

[21] Appl. No.: 589,045

Related U.S. Application Data

[63] Continuation-in-part of Ser. No. 405,671, Oct. 11, 1973, abandoned.

[52] U.S. Cl. ................................. 35/9 A; 35/22 R
[51] Int. Cl.² ............................................ G09B 7/04
[58] Field of Search ............ 35/8 A, 9 A, 9 B, 22 R, 35/35 C; 128/2.1 B; 350/160 LC

[56] References Cited
UNITED STATES PATENTS

| | | | |
|---|---|---|---|
| 2,564,089 | 8/1951 | Williams et al. | 35/9 A |
| 2,965,975 | 12/1960 | Briggs | 35/9 B |
| 3,142,909 | 8/1964 | Irazoqui | 35/35 C |
| 3,195,533 | 7/1965 | Fischer | 128/2.1 B |
| 3,221,418 | 12/1965 | Hoernes | 35/9 A |
| 3,357,115 | 12/1967 | Kelley | 35/22 R |
| 3,725,899 | 4/1973 | Gruebel | 350/160 LC |

*Primary Examiner*—Wm. H. Grieb
*Attorney, Agent, or Firm*—Eliot S. Gerber

[57] ABSTRACT

A teaching machine adapted to take account of the student's ability and progress operates with programmed cards and includes three stacking means, controlled conveyor means, display means and a student input means, such as a keyboard.

52 Claims, 14 Drawing Figures

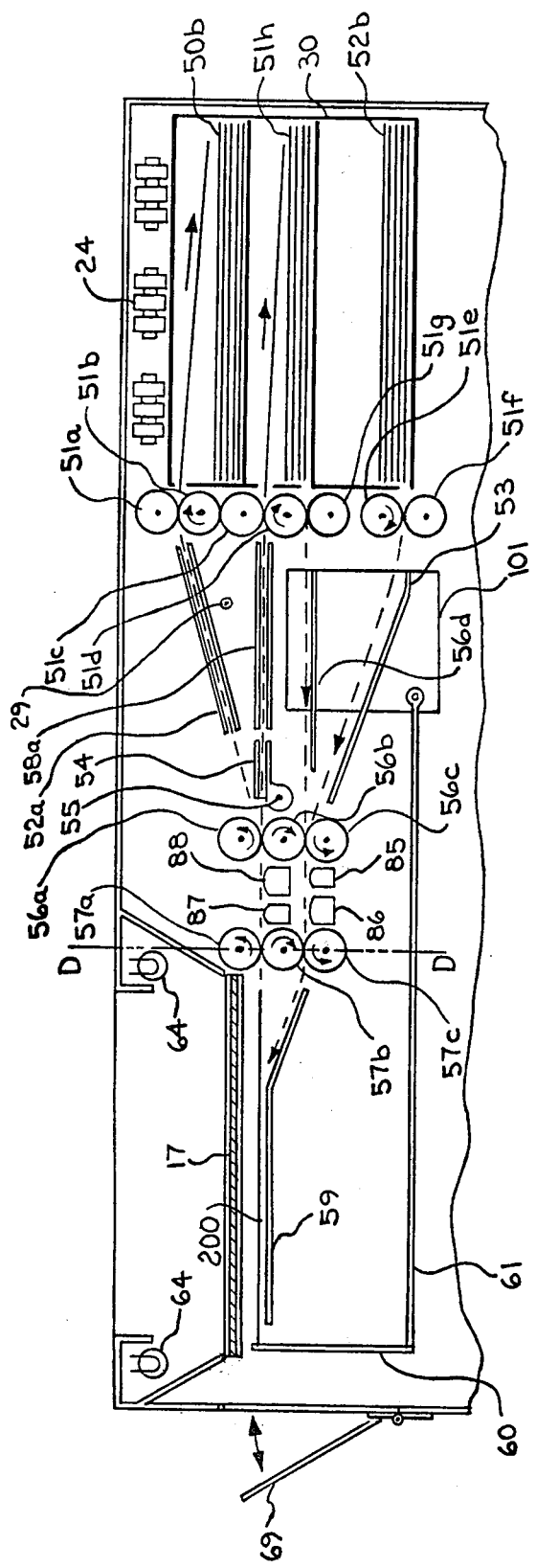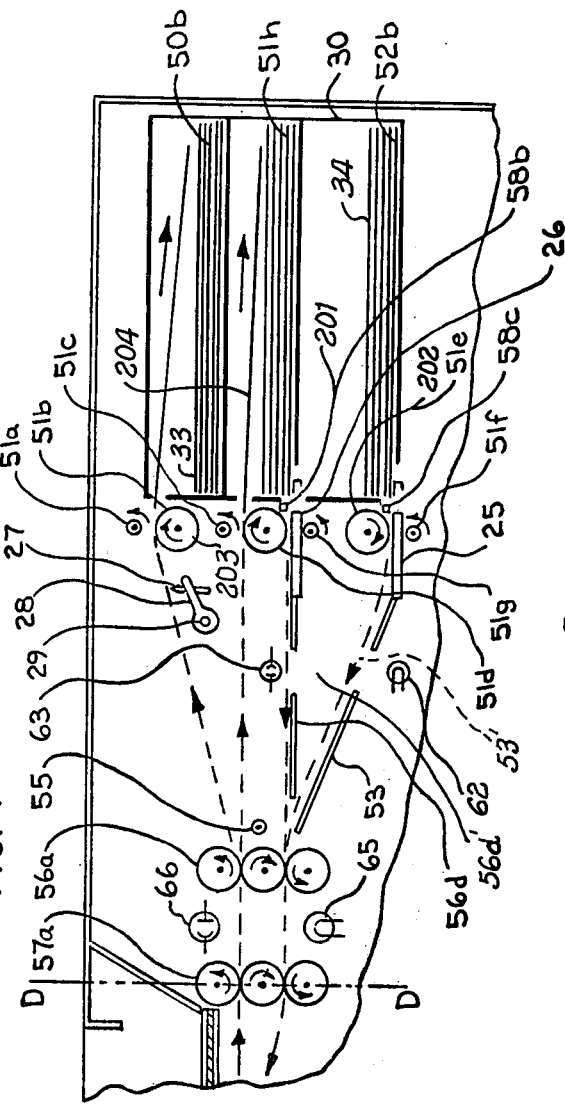

FIG. 10 CONTROL CIRCUIT

FIG. 12

TEACHING MACHINE

This application is a continuation-in-part of Ser. No. 405,671 filed Oct. 11, 1973, and now abandoned.

BACKGROUND OF THE INVENTION

The present invention relates to teaching machines.

The rising costs of education, resulting in the raising of taxes in many localities, has given new and added impetus to the search for methods of teaching pupils which do not directly utilize the teacher's time. The increased emphasis on educational proficiency, particularly for the economically disadvantaged, has also given rise to the need for better methods in which information may be imparted to individuals. The need for such improved methods is particularly strong in regard to cognitive or rote learning, that is, the learning of material which can only be learned by repetition. Teachers resent spending their time in endless drill of such information, particulary since their skills in teaching concepts, inspiring and handling pupils are not being utilized. Teacher conducted drills are deficient because they do not allow for any difference between the learning rates of different pupils or for the background or proficiency of such pupils. Consequently, during such drill periods many students are bored while others are not able to keep up with the class.

A great waste of the teacher's time is occasioned by the disparity in the learning of various pupils, that is, facts which one pupil knows are unknown to another, and vice versa. Thus, the patterns of missing facts in the memories of the various students in a group are always completely different, so the teacher must, in effect, act as a private tutor to each student and ends up teaching almost all the factual background required, even though it may be considered as a prerequisite for the class being taught. This "Information Hole Filling" process which all teachers engage in has been estimated as taking up as much as 80% of the teacher's time spent with the individual students. This poses a particularly serious problem in certain situations, for example, for the minority student arriving at a university where this background of "holes" in his knowledge is particularly difficult to rectify because of the costs of the individual instruction required.

A major difficulty in implementing individualized instruction is that there must also be a testing procedure which is also individualized. The time required for such a testing procedure generally makes it impracticable, and thus instruction may only be individualized within the limited range encompassed by the testing procedure, which generally requires that all learners be tested at once on a given type of material.

In the sale of many types of goods where many competing possibilities exist, such as in the purchase of a house or a particular brand of liquor, or a particular type of instrument, the purchase must be based on comparison of a large number of comparable items where eventually the choise depends on a comparative value judgment. A machine capable of displaying items on a comparative list and eliminating items from that list as the purchaser rejects them can aid in the decision process. Such an instrument might be referred to as a "selling display machine".

THE PRIOR ART AND ITS DEFICIENCIES

There have been various teaching machines proposed to aid teachers in the classroom situation. Some of those are based upon specific theories of learning, which theories have met with hostility and rejection by many educators. Still other proposed machines are more acceptable and are relatively simple and inexpensive; however, they do little more than can be performed using a pencil and paper. In other words, their range of function is so limited that in many situations they are almost useless. Also, there have been other teaching machines proposed — and a few built — which are relatively expensive and complex, for example, those using an output terminal which is connected to a computer. The cost of the system hardware, including the rental time of the computer, the rising costs of communication lines and the large cost of the software, i.e., programming the computer, has prevented the widespread acceptance of such systems.

In general, such teaching machines, from simple mechanical devices through large scale time-shared computer systems, operate by presenting a question in visible or audible form to a student. The student responds by pushing a series of buttons or writing in a blank space. Depending on the complexity of the machine, the next question in the series is presented either when the student has responded in any manner to the question or, in more complex machines, when he has responded in a correct fashion. The nature of the next question may or may not depend on the nature of the student's previous responses, again depending on machine complexity.

Presently available teaching machines are not generally susceptible to control of their program by either the teacher or the student. The complexity of loading the program and the mechanical delicacy of the present machines prevents their use much below the junior high school level. The teacher time required to place the present-day machines into operation may occur during critical classroom situations and consequently the utilization of these machines may be impractical in actual classrooms. At the present time the evaluation of the student's response to the machine, if such evaluation can be made at all, involves recognition only and not recall, or alternatively is very time consuming for the teacher and usually requires that the teacher spend a great deal of time outside of the classroom. In addition, the lack of program flexibility has made the cost of developing the teaching programs very high. The inability of present machines to individualize their programs to fit the individual student so as to teach only those things which are necessary, and further to know when the necessary amount of instruction has been accomplished, makes them useless in the "hole filling" process mentioned above.

Previous attempts at building selling display instruments have generally concentrated on catching the attention of the potential buyer, rather than assisting him in making his decision. At the same time, in some industries the number of comparable items competing for the potential purchaser's attention has greatly increased. There has been an increasing emphasis on reducing selling costs by reduction in the sales force and depending increasingly on having the customer make his own choice. Further, decrease in sense of responsibility by some sales persons makes it advantageous to have a machine provide some of the sales pitch to assure that the customer is exposed to it.

OBJECTIVES OF THE INVENTION

It is consequently an objective of the present invention to provide a teaching machine which is relatively simple for the pupil or the teacher to operate, which is relatively rapid for the teacher to place into condition for operation, and which is relatively inexpensive to purchase and to use.

It is a further objective of the present invention to provide a teaching machine in which the programming may be performed expeditiously and without a great deal of previous training by the teacher or, alternatively, the programming may be performed at low cost by others, or by the student.

It is a further objective of the present invention to provide a teaching machine which may adapt to various aspects of the personality of each pupil who utilizes it; which is capable of recognizing that an item has been learned on the basis of (a) previous history, (b) a learning algorithm, and (c) input data about the student's learning capabilities; which makes use of the results of this algorithm to change the material it presents to the pupil as he learns; and which modifies the learning algorithm's results on the basis of the momentary mood of the pupil as he experiences it.

It is a further objective of the present invention to provide a teaching machine which has the capability of learning where the information "holes" in the background of the student are, and selecting appropriate portions of the programming material to fill those holes, rather than spending time repeating material the student already knows. This machine attribute is particularly important in bringing the various students in a group to the same state of knowledge so that the teacher's efforts can be more effective since she can work with a group all of whom have attained a common set of information.

It is a further objective of the present invention to provide a teaching machine which supplies a visible readout to the student and a printed record to the teacher which is a summary of the pupil's proficiency in responding to the questions, which record may, if the pupil's personality so requires, be suppressed and not viewed by the pupil; and further to provide information to the teacher concerning items which the student's behavior indicates are causing him difficulty.

It is a still further objective of the present invention to provide a teaching machine in which the machine automatically cycles a group of items to be learned of the optimum number of times for the student involved, keeping records of performance on each item until the item has been adequately learned by a recognizable pattern of correct answers, and then making the decision that a certain item is learned on the basis of this historical pattern. Thereafter that item is removed and replaced with an item previously chosen by the teacher. The machine will automatically remove old performance records concerning items as soon as the need for such records disappears.

It is a still further objective of the present invention to generate an environment by the presence of this teaching machine which leads pupils to compete against each other in a socially acceptable fashion; and which reinforces learning by associating muscular activity, which may be adjusted to the strength of the individual, with the learning process.

It is a still further objective of the present invention to provide a teaching machine in which tactile responses, such as a keyboard in the form of a musical instrument, may be used to teach students skills which would ordinarily require great mutual interaction between student and instructor; and which may also handle materials associating visual, auditory and tactile experiences such as in the process of musical ear training.

It is still further objective of the present invention to provide a teaching machine which can handle material from the preschool teaching of reading, through postgraduate, commercial, technical and sales training, wherever the memorization of factual material is involved and which generates information about the pupil which is sufficient for testing purposes and thus eliminates the time spent in testing.

It is a still further objective of the invention to provide a teaching machine which interfaces appropriately with the general educational system at both the psychological and administrative levels such that the machine takes over the specific function of teaching cognitive materials which are within the range of ability of the pupil to handle and, when the machine is incapable of handling the function with the program which it has been given, the machine is capable of recognizing its deficiency and feeds back information to the teacher identifying specific items which the student's reactions indicate he is unable to handle, thus permitting the teacher to handle these items where the teacher's skills are really required. Further, when failures of the machine or the system backing it occur, such as an error by the teacher in assigning materials to the student, the reactions of the machine are designed to initiate corrective actions on the part of users.

It is still further objective of the invention to provide a teaching machine having a series of different types of activities which have times associated with them, which times are computed by various timing algorithms which take into account such variables as the relative time required to handle the material presented, the nature of the subject matter being presented (since some students may react rapidly to verbal problems and slowly to mathematical ones), the relative speed of the student in each of these areas, and the mood of the student as he perceives it at the time.

It is a still further objective of the present invention to provide a testing machine which may be connected by telephone line to a computer system to output the information it collects through interaction with various learners.

It is a still further objective of the invention to provide a teaching machine which can handle small groups of associated items as a unit which can be kept together. The order, either a serial or student controlled order, may be maintained, as would be desirable in the teaching of the solution of a problem step by step, or the association of the various forms and tenses of French verbs.

It is a still further objective of the present invention to provide a selling display machine to assist the customer in the selection of comparable items where the updating of the stock available is simple and easily programmed, and where a portion of the sales pitch, both visual and acoustic, can be carried on by the machine as the potential customer considers individual items, but where the customer can abort any sales pitch and go on to another item. The customer's choice as to the materials to be considered can be simply shown by selection of a given pack of materials for insertion in the machine from a larger grouping which represents the entire stock of the store in question.

It is a still further objective of the present invention to provide a teaching machine which may be either self-programming having a programming mode of operation as well as a teaching mode.

It is a still further objective of the present invention to provide a personality tesing machine which may present visual and acoustic stimuli to the user and record responses along with the associated response times, all of which are recorded, which may at a later convenient time be fed directly to a computer for evaluation. In view of the high cost of having a trained psychologist assemble data on an individual's reactions and then evaluate these reactions in detail, the ability to produce a multisensory interaction with the machine, and then enter the results directly into a computer without the necessity of intervening human coding and typing, provides new opportunities for a lower cost form of psychological testing. Further, personnel testing such as the administration of tests on driving rules, certification as an auto or aircraft mechanic, or as a bank teller or secretary, may be carried out by the machine of the present invention.

It is a still further objective of the present invention to provide an exercise machine for children. Young children are apt ot lose interest in doing exercises and it is therefore difficult to increase their bodily condition if they are not self-motivated in this direction. By connection of this machine to exercising apparatus which must be activated in order for the next step in the machine processing to take place, it is possible to present material of great interest to the child such as comic book style presentation with the addition of audio output and in order to continue with the next frame of the material the child must exercise on the appropriate exercise machine.

It is a still further objective of the present invention to provide a teaching machine with the capability of self-evaluation of the items programmed. The machine can interact with a group of students, one after another, utilizing the same program and recording on the cards the nature of the individual student's interaction, while at the same time identifying the student and his characteristics by additional input through a student record either from the student option memory or the teacher option memory. This data may later be fed into a computer for validations of the various items and their effectiveness in producing learning. Thus, the nature of the items in the programs may be screened with a small output of effort and these items improved.

SUMMARY OF THE INVENTION

AVIT (Audio Visual Interactive Teacher) function depends of the following components and functions.

In accordance with the present invention AVIT (a teaching machine) operates from an electric power source and uses a set of cards placed in a cassette which cards (a) are specific to the material being learned and (b) are specific to the student involved. In addition, the AVIT teaching machine has information inputs concerning the machine's behavior pattern with respect to the student and its behavior pattern with respect to the teacher and administrative system. It contains a card handler and a control circuit which includes a learning algorithm. It has multiple inputs and outputs to students, teachers, and outside systems. The inputs and outputs may be optical, electrical or mechanical.

AVIT has capabilities as follows:
1. It can treat learners as individuals;
2. It can mechanize the learning pattern of humans for cognitive material;
3. It can evaluate recall type answers;
4. It can automatically switch into a teaching mode when an item is not known;
5. It can require physical effort as a part of the learning process;
6. It can learn about the user's state of knowledge and reprogram itself to fit that state;
7. It can accept instruction from a user concerning his knowledge pattern to speed up its own learning process;
8. It can call for help when the learning situation gets beyond its control, and can identify the problem items in the learning process, but do this without interrupting a learning session, so that teacher action can be effective at the next session, but AVIT avoids the problem when it occurs.
9. It can run tests of individuals collecting inputs indicating psychological and physiological states of the person involved.
10. It can output data it has collected to a computer, acting as a terminal to permit the operator to make the connection, then once communication has been established it can transfer its data directly.
11. It can control external pieces of apparatus about which the learner is to be informed, and make them behave appropriately to the learning situation under control of its program.

Information Management

CARD SET

A set of cards is used to manage the data required to teach or evaluate cognitive material. The set of cards for an individual student is housed in a special cassette, different card sets being used for different learning materials. Each card contains all of the data concerned with a specific item to be learned by the student, or about which the user (student) is to make an evaluation or to be tested. Said information includes:

a. visual material on the front side of the card; and
b. acoustic information magnetically recorded on the back side of the card; both to be presented to the student. In addition the card carries (magnetically recorded on its back side)
c. digital information concerning the correct answer or other response of the user (student) to the item; and
d. digital information determining the rules by which the student is to interact with the specific item of information; and
e. a digital record of the user's (student's) interaction with the particular item.

Some of the items carried by the card as a part of the "rules of Interaction" (d above) include such pieces of information as the difficulty of the item which goes to the learning algorithm (below), the time required to answer the item, the code for the control of the transparency pattern of the matrix window display, the sequencing codes to permit a multiplicity of associated questions where either there is a required sequence imposed on the order in which each question is to be answered before the next is supplied, or codes which allow the student to control the order in which the various questions on a single card are to be displayed and answered from the keyboard.

Since all the information concerning a particular item is concentrated on one card, that card contains not only the mechanism for interaction with the student concerning that item (audio and visual outputs) but also constitutes the complete machine memory for the machine's interaction with that individual student concerning that individual item.

DATA INPUTS TO THE MACHINE

AVIT manages the sequencing of items (cards) and its own behavior pattern both to the individual student with the individual card and to the surrounding sociological and administrative environment around it, on the basis of four types of data input, namely:
1. the card information (above);
2. the student option memory;
3. the teacher option memory; and
4. the student responses The student option memory provides information concerning behavior pattern to the individual student, independent of the material being taught or examined. For example, the amount of repetition a student requires, compared to other students, in order to have learned an item is one input. Another is the amount of time the student requires to respond, compared to others. The teacher option memory provides information concerning AVIT's interaction with the teacher. For example, it controls the information feedback from AVIT to the teacher, the transfer of AVIT collected information to other places (for example, to a computer). It also provides information needed by the machine for all users (the date, for example).

The user's inputs may be of many different kinds, the most common being a keyboard and a handle providing physical resistance the user must work against. Other forms of input, which are as varied as the activities of human beings, can be sensed electrically. Examples of such inputs are:
 a. electroencephalographic data (Alpha, Beta, Gamma and Delta brain waves);
 b. the galvanic skin response;
 c. the output from Sentic sensing systems (Sentics: The touch of emotions — Manfred Clynes, Doubleday);
 d. the operation of machines, including musical instruments, controlled by the AVIT user in response to AVIT's program. For example, a microphone with frequency sensing, as well as a sensor for the time of persistence of the frequency, permits the response to be a series of tones either sung or played by a musical instrument.

Learning Pattern Requirements

In cognitive learning a learner is presented with a question concerning an item to be learned to which he is to give a specific response. After that item has been responded to, another item is considered. This process continues until the same items start to be repeated as a necessary part of the learning process. The process continues further, repeating all the items within the group, until one item is learned. Once this happens, the item is removed from the group and the process continues. Learners engaged in this process often remove an item and do not add another, but this has the disadvantage that after a number of such removals have taken place the number of items seen between two successive repeats of the same item becomes very small, and direct memory bridges the gap without the intermediate forgetting process necessary to developing longer range memory. A more efficient method of item handling is to replace each item removed with a new item and then to continue the process.

MECHANIZATION OF THE LEARNING PATTERN

AVIT mechanizes this process by the use of an "active stack" of cards, each card representing one item. Cards are picked from one end of the stack, processed by the learner, and then returned to the other end of the stack. The processing includes the student responses to AVIT mentioned above.

Recall Answer Evaluation is required for cognitive material to be learned by a question and answer type of process such as this. A recognition type answer (multiple choice) is not adequate, as will be shown below.

AVIT Teaches the student about those items which he answers incorrectly by presenting him with the correct answer in visible form. The visible material is so positioned on the face of the card as to match up with the shutters of a display window (the shutters being dark areas in the liquid crystal matrix which become transparent under control from the microprocessor) so that specific portions of the visible material may be made visible or may be hidden by opening or closing the shutters between the card and the student respectively. AVIT shows the question on the card either by having the shutter in front of the question open, or having no shutter at all in that position. Then, once a wrong answer has been entered AVIT may, under one set of student options, switch into a "repeat mode" in which the shutter over the answer is open so that the student can see the answer, the acoustic portion of the question is replayed, or if an answer can be given acoustically, it will be played in the repeat mode, and finally the student is required to enter the correct response while observing and hearing that response from the machine. Thus several senses are involved at once.

AVIT Generates Competition for the Student by feeding back a set of three numbers. These are: The total number of items (cards) done; the number of items done correctly; the elapsed time required. The combination of these three numbers, presented to the student when he is finished with a session with the machine, and which may be shown during the session (depending on the student option input) provides a basis for competition between students, or competition with one self on the basis of various sessions.

The scores are also printed on a paper inside the cassette so that a record of performance is generated each time the student and AVIT interact. This provides a running record of student performance.

AVIT "Talks Back" through a symbol display (as distinguished from the display window) to assist the student in locating his mistakes. The symbol display shows the student what he has typed in. To identify an error, the symbol display permits the comparison of correct and incorrect answers. The display also is an assurance to the student that AVIT has "heard" him. Further, the presence of the display permits AVIT to communicate with the teacher. This is useful in analyzing system errors and in connecting AVIT to act as a computer terminal.

In addition, the symbol display is a dot matrix and the codes for character generation may be input through special purpose magnetic cards read in the usual way, but whose data constitutes the format of any symbol set which is desired. Thus any special symbols may be input at the beginning of any program which will need that set. The keyboard can be changed to correspond by slipping a rubber cover having the appropriate symbols on it over the keys.

AVIT Requires Physical Effort in addition to the multi-sense presentation. An input for physical effort, such as a handle to be pulled, is provided. This device accelerates the learning process by concentrating the attention of the user at a time a decision is made to insert the answer. As the effort required to pull the handle must be sufficient to be psychologically significant, it is desirable that the handle resistance be adjustable to allow for the differences in strength between various users, for example, professional weight lifters and kindergarten children. The level of the physical resistance is controlled through the student option memory, combined with other inputs listed below for the learning algorithm, especially the mood control.

In its teaching activities AVIT provides correction information by an "error" lamp and/or noisemaker, and by a "correct" lamp and/or noisemaker. It further provides an "Instantaneous Wrong Indicate" button which is activated during the repeat mode and which causes the "error" lamp to light at the instant when an incorrect key is pressed. Thus if a student has trouble locating his error, this function can indicate to him the exact key push at which his error occurred.

AVIT Learns about the student's state of knowledge, and uses this learned information to reprogram itself to fit this individual student's needs. This capability of learning and reprogramming is supplied by the provision of items as follows: (1) a learning algorithm; (2) a reject stack of cards; (3) a reserve stack of cards; and (4) a transport mechanism to eject cards from the cycling process described above to the reject stack, and to add cards to said cycling process (i.e., to the active stack) from the reserve stack. The learning algorithm, as shown below, is capable of recognizing when a student has had sufficient experience with an item, taking account a large number of factors.

The definition of learning used here is "Modification of further behavior on the basis of past experience". AVIT's behavior consists of the presentation of the items (cards) to the student, and the AVIT-student interaction. As those items become known to the student (i.e., he learns them), he will respond to them correctly more often, and finally the learning algorithm will recognize one of them as having been learned. The card carrying that item is then removed to the reject stack by the transport mechanism. The next card that is drawn will be taken from the reserve stack. AVIT's behavior in the future will now be different in that it has removed the learned item and substituted for it a new item from the reserve stack, i.e., the machine, in a sense, has learned and reprogrammed itself.

AVIT Can Be Taught by the student about the level of the student's knowledge. This capability is supplied by the provision of an "I know this" button. When a student is presented with a card concerning information he already knows, he pressed the "I know this" button. As it is not certain that a student's reaction is correct, in order to have the "statement" that he knows this item accepted, he must first enter his answer and have it approved by the machine. If the answer is correct AVIT responds by transporting that item (card) to the reject stack, and again drawing a new card from the reserve stack. Thus AVIT has again "learned" in the sense that its future behavior will change on the basis of its past experience, but it has been taught by the student so that a rapid response could be made to the student's state of knowledge as demonstrated by a test of that knowledge. Once that test has been passed, the known item was not cycled, and therefore did not waste the student's time.

AVIT Calls For Help in the case where the student finds it impossible to answer a question correctly, either because of a machine failure, a failure in programming, or a failure in some other aspect of the total system which leads the student to wish to make AVIT go on without forcing him to answer that question correctly. For this purpose a "take it away" button is provided which has the effect of causing the immediate removal to the reject stack of the card being processed. To enable the teacher to identify items causing such problems, and to correct the problem whether it be the learning problem of the student, a machine failure, a program error, or provision of the wrong program to the student, the offending card is visibly marked on its way back to the reject stack in the cassette. On examining the cassette later, the teacher looks for such marks on the back side of the cards in the reject stack. Any found with such a mark constitute an indication of a learning-teaching failure on that card which can be interpreted as AVIT's calling for help because it had run into a situation it was incapable of handling and so informed the teacher.

RECALL ANSWER EVALUATION

As mentioned above, a recognition type answer is not adequate to our purpose here. For example, one cannot learn to spell the word "Arithmetic" by being given five alternative spellings of the word and being asked to pick out the correct one. Instead, it is necessary that the correct answer be the sequence of the letters in the word "arithmetic" rather than any multiple choice type response. Thus a control system capable of evaluating recall type answers than the simple recognition type is required. Further, value judgments as to what is "right" are provided in the "rules for interaction" carried on the card, to permit evaluation appropriate to the material being learned. For example: in a spelling lesson one might be asked to "spell Washington", while in a history lesson a question requiring an identical response is, "Who threw a silver dollar across the Rapahannock River?" In the first case the spelling is critical, so an exactly correct response is required; while in the second spelling is of subsidiary interest, so an answer evaluation algorithm could accept the answer as correct if any 7 out of the 10 letters are in the correct order.

THE LEARNING ALGORITHM

The learning algorithm bases its decision as to whether or not an item has been learned by the student on his past behavior, as indicated in the student record on the card, as well as any additional information available in the particular machine configuration concerning the student's momentary condition for learning. Such inputs include: (a) the number of times the particular item was done correctly; (b) the total number of times the item was done; (c) the difficulty of the item to be learned (from the "rules for interaction" carried on the card); (d) the period of time since the last interaction of the student with this item (which implies the degree of forgetting which has occurred in between), i.e., this time is determined from the date in the student record entered the last time the individual card was used and the present date available from the teacher option memory; (e) the student's momentary mood (whether he feels well or depressed) as input directly by the student through a rotatable knob known as the "Mood control"; (f) the "learning area" in which the item to be learned fits, as indicated by the "rules for interaction" carried by the card; and (g) a series of numbers, each associated with a "learning area" (as indicated by "f" above) which give the relative amount of repetition required by this student in this learning area in order to achieve a certain level of proficiency. This information, which is relative to a standard repetition requirement for an average student, is supplied through the student option memory.

An example of an algorithm including all of the above utilizes the above letters as mathematical symbols where the symbolism is that used in the Fortran or Basic computer languages: H=C/E−(100*((-B−A)/B)−D)*100/G(F). If H is positive the item has not yet been learned, but if H is 0 or is negative the item has been learned. All numbers are assumed positive, and E increases with good feelings.

DESCRIPTION

BRIEF DESCRIPTION OF THE DRAWINGS

FIG. 4 is a section through the card handler along section B—B (FIG. 2) showing the picker and roller systems as well as the magnetic head positions, the display position and card return pusher;

FIG. 5 is a section through the card handler along section C—C as shown in FIG. 2, showing light beam card sensors, card pencil marker, and the combination of picker tongues and separator knives;

FIG. 12 is a view of an optical option input card with group one blank, group two addressed to location 1 and having options 1, 4, 6 and 8 turned on while options 0, 2, 3, 5, 7 and 9 turned off. Groups three, four and five are addressed (in binary) to locations two (000010), three (000011), and four (000100) carrying the numbers 6, 5 and 8 respectively. Groups 6, 7, 8 and 9 are blank, i.e., addressed to location zero.

DETAILED DESCRIPTION OF THE DRAWINGS

General Description of the System Hardware

Figure 1:
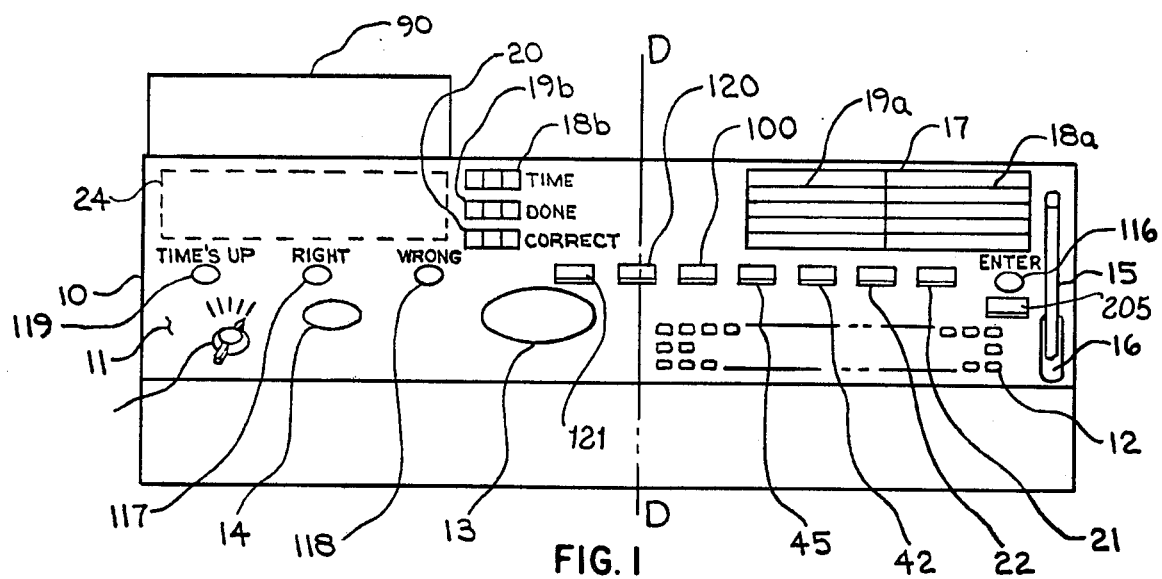
FIG. 1 is a front view of AVIT, the teaching machine of the present invention.

As shown in FIG. 1, AVIT, the audio visual interactive teacher, comprises a housing 10 having a front panel 11 which is angled relative to the user. A keyboard 12 is mounted on the front panel 11 and consists of a number of depressible keys. Each key has fixed on its surface an indicia such as a number, letter, punctuation mark, or other symbol. Preferably the keyboard 12 is arranged in the form of a standard typewriter keyboard. The keyboard is the operable means for the student's or the programmer's input of answers and for the programmer's input of question related data during the programming process.

The making of the cards constitutes the programming of the machine. A microphone 14 is mounted on the panel 11 and allows the programmer to input audio information onto an intermediate magnetic tape loop storage 47 during the process of card making. A loudspeaker 13 (or earphone, not shown) is also mounted on panel 11 for use in both teaching and programming modes of operation. In the programming mode the information which was recorded on the tape loop 47 from the microphone 14 is transferred to the card. In the teaching mode the acoustic information is transferred from the card to the magnetic tape loop, then played back through the loudspeaker. A handle 15 is movable within an open slot 16 on the panel 11, the details of the handle mechanism being set forth in FIGS. 6 and 7.

VISUAL OUTPUTS

A display 17 mounted on the housing provides a plurality of spaces for sequences of questions and answers. For example, right side 18a for the answer and a left side 19a for the question. This format, however, is chosen to fit the individual item being taught. Display 17 preferably comprises a liquid crystal matrix window the purpose of which and its interaction with the learner and the card is described above under "AVIT Teaches". The panel has also mounted thereon an elapsed time display 18b, a "Total done" display 19b and a "Total done correctly" display 20. These displays are controlled by combinations of the data from the student and teacher option memories. the actual state of the student's learning and the "rules for interaction" carried on the card as described under "Card Set" and "Data Inputs" above. Their presence implements the function described under "AVIT Generates Competition" above.

In addition, the panel 11 also has mounted thereon the "Symbol Display" 205 which is a dot matrix or other arbitrary symbol writing system. It implements the function described above under "AVIT Talks Back". The coding for this display is such as to permit any type of arbitrary symbol to be displayed.

FRONT PANEL STUDENT CONTROL INPUTS

A "mood control" 23 and a series of special buttons 21, 22, 42, 45, 100, 120, 121 provide direct student control of the machine. In addition the student option memory input, discussed below, provides automatic and indirect control of machine behavior to fit its behavior pattern to that of the student.

The mood control 23 permits the student to influence the response of the machine, depending on his momentary perception of his abilities and how much learning pressure he desired. An example off its effects is given under "Learning Algorithm" above.

The buttons have the following functions: Unconditional reject 21, "I know this" 22, correction 42, replay audio 45, stop session 100, show error 120, and "hint please" 121. Each is discussed separately below.

Rejection button 21 states in effect that the student does not wish to answer the question being displayed at that time, but wishes to go on to the next card.

The "I Know This" or "Reject With Cause" button 22 throws the machine into another mode where it will also reject the card being displayed, but only if the student shows, by answering it correctly, that he does, in fact, know the question's answer. The machine differentiates between this action and the reject action by a difference in marking the cards with the card marker 27, 28 of FIG. 5 returned to the teacher, and also by the fact that in this mode the machine will not reject the card if the student does not in fact know the item as shown by his giving an incorrect answer. Should a wrong answer be given in this mode, the wrong answer lamp 118 comes on, and the fact is noted in the student's record which is placed on the card. The card will be shown to the student again at a later time.

The correction button 42 is used to indicate that the student knows he has made an error and wishes to again answer the question without being counted wrong for his original answer.

The replay button 45 is a request for a replay of the acoustic message which is preferably played once automatically when a new card comes into place but may be replayed as often as requested by replay botton 45.

The "Show Error Button" 120 throws the machine into a mode where it indicates which symbol in an answer string as incorrect by responding with the error lamp at the instant that a wrong key is depressed, rather than waiting until the handle 15 is pulled. Such identification of mistakes permits the student to identify his misconceptions concerning answer errors. This is especially true when he is entering an answer while viewing the correct answer and still makes mistakes because his perception of what he is seeing and the reality differ. The function of this button may be input to the learning algorithm to prevent a mistaken evaluation from being made if this option is activated.

By the use of "stop session" button 100 the student indicates that he wishes to stop the session. Thereupon the machine repackages the cards into the cassette, prints out his record on a special card which is held inside the inner cassette 30 at position 97 (FIG. 8), reseals the cassette, and releases it to him.

The "Hint Please" button 121 is a request from the student for an acoustic hint, or possibly a visual hint from another portion of the card 210 to assist him with the question being posed. This hint is forthcoming after a precalculated time which depends on both the student and the item being answered. The nature of the hint is determined by the material being presented, and whether it is the first or second, etc., hint given for that item. At the same time the fact that the student requires one or more hints can be fed back into the learning algorithm to indicate that his knowledge is not as great as it might otherwise seem.

PHYSICAL CONNECTIONS TO AVIT

Figure 8:
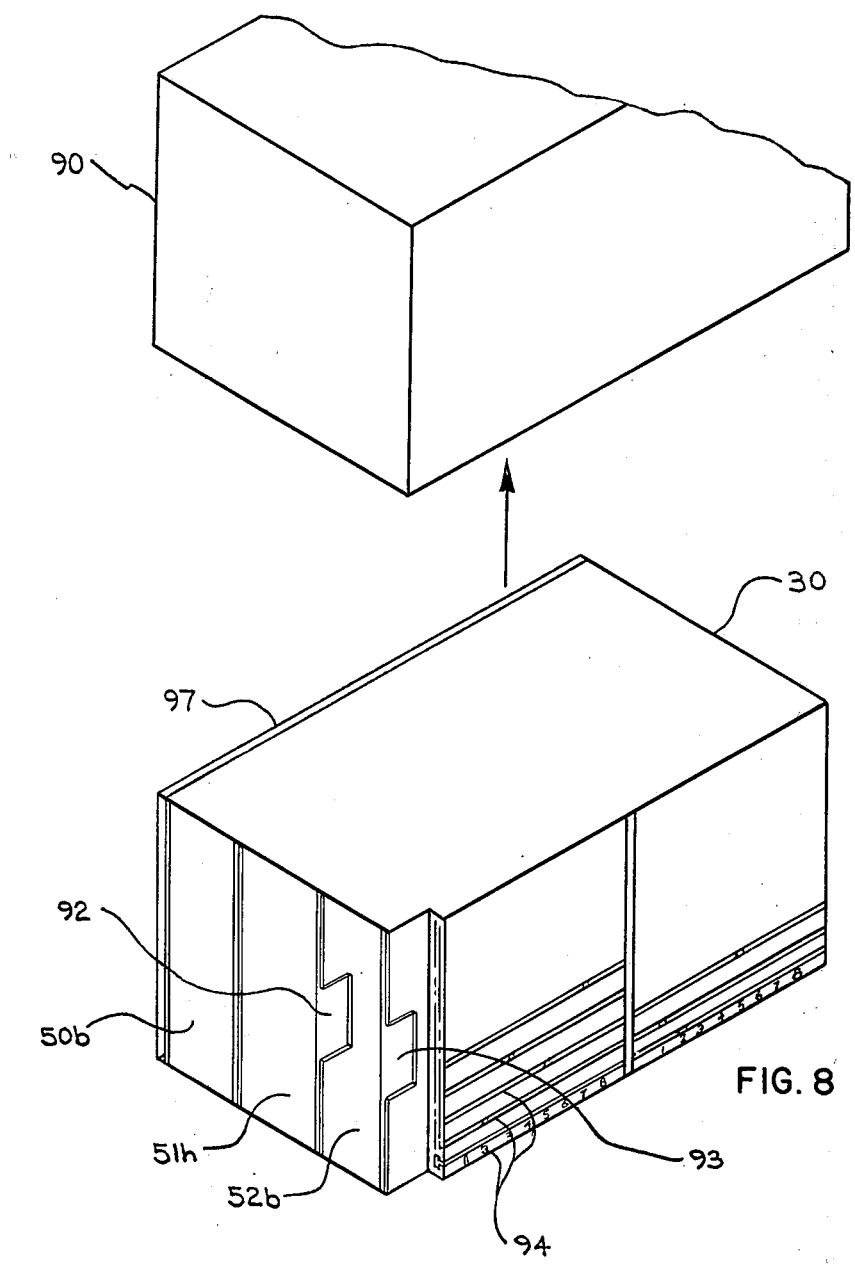
FIG. 8 is an exploded view of inner and outer cassettes including a student option memory system.
Figure 8A:
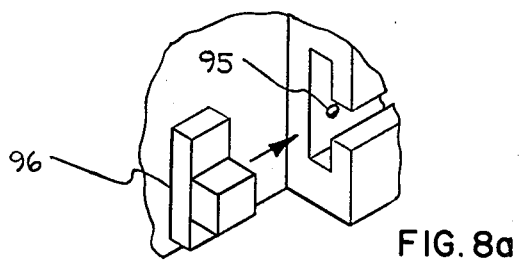

An inner cassette 30 is replaceably positioned within the housing 10 after it is removed from the outer cassette 90, see FIG. 8. Preferably each student is assigned his own cassette. The student pushes the outer cassette 90 within the machine, causing it to be automatically locked to the housing 10 while the inner cassette 30 is unlocked from the outer cassette 90 and drawn automatically into its operative position within housing 10. A multiplicity of cable sockets 31 are provided on the housing for cables (not shown). The cables provide input power which is ordinary 110-volt a.c. current; input from the electrodes, amplifiers and strain gauges used to measure the student's physiological condition; output to earphones and output in the form of electrical pulses. The later output may be used, for example, to accumulate scores and other data on the details of student-machine interaction which may be collected either by a separate digital recording device or by direct connection to a computer. The student's physiological condition may be sensed through a wide variety of systems such as discussed above under "Data Inputs to the Machine" — user inputs.

OPTION INPUT SYSTEMS

Both student and teacher option inputs are required, the student options referring to the behavior pattern of the machine to the student, while the teacher options are of a more general nature. They include general directions and information for the machine concerning the information it feeds back to the teacher or inputs to a computer, or receives from other sources, or may be simple data such as the date which permits the learning algorithm to take account of student forgetting patterns. At least three alternatives exist, as follows:

A reed switch system may be used. As shown in FIG. 8, the bottom wall of the inner cassette 30 is provided with a set of "T" shaped channels 94 and have holes 95 in the bottom of the channels. The holes 95 cooperate with a spring-loaded ball (not shown) on the bottom of each of the magnetic pegs 96. Each one of the magnetic pegs 96 may be moved along the channel 94 and placed in any one of the detented positions. These magnetic pegs 96 cooperate with reed switches within the machine casing 10. The reed switches close because of the presence of the magnetic pegs, the set of switches acting as the option input and memory system. This system has the advantage that a power failure does not destroy the data. On the other hand, it is inconvenient for teacher option memories, as the teacher must set each student cassette, rather than putting in his input once.

Figure 13:
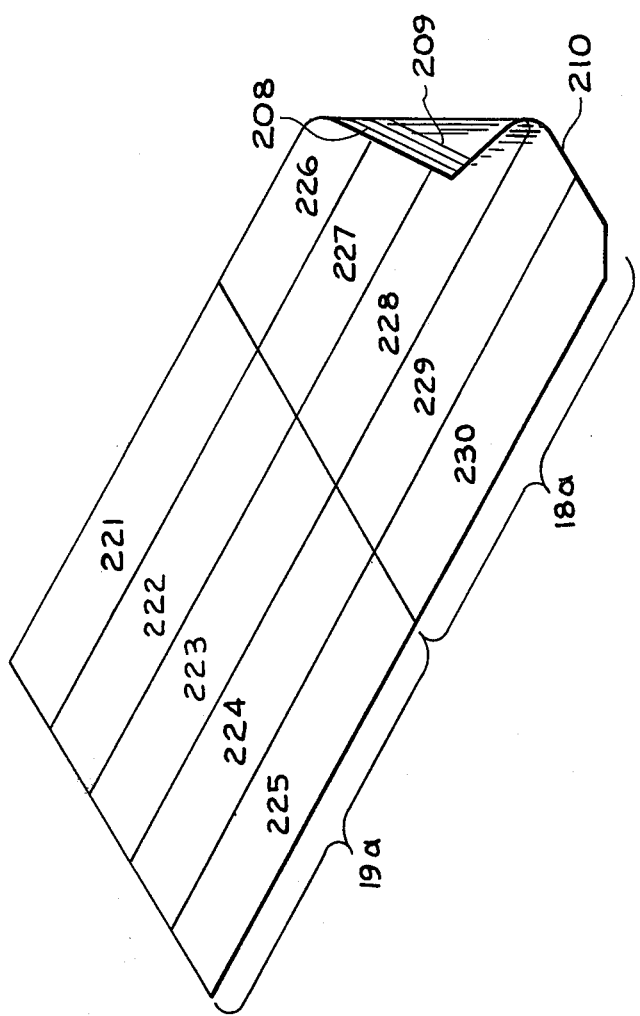
FIG. 13 is a front view of a teaching card 210 with its corner turned over to permit viewing the magnetic tracks on its backside. The solid lines on the front of the card show the boundaries between visible segments which are numbered 211 through 220. Magnetic track 208 is the digital magnetic track on the back side of the card while track 209 is the acoustic magnetic track next to it.

The regular magnetic cards 210, FIG. 13, may be used as option memory inputs, which occasions no additional costs, and different cards may be used for student options as opposed to teacher options. The disadvantage is that the cards can only be read and modified using the machine directly, and cannot be done elsewhere away from the machine as is the case with the cassette in case A, or with a paper and a pencil as in case C below.

Figure 12:
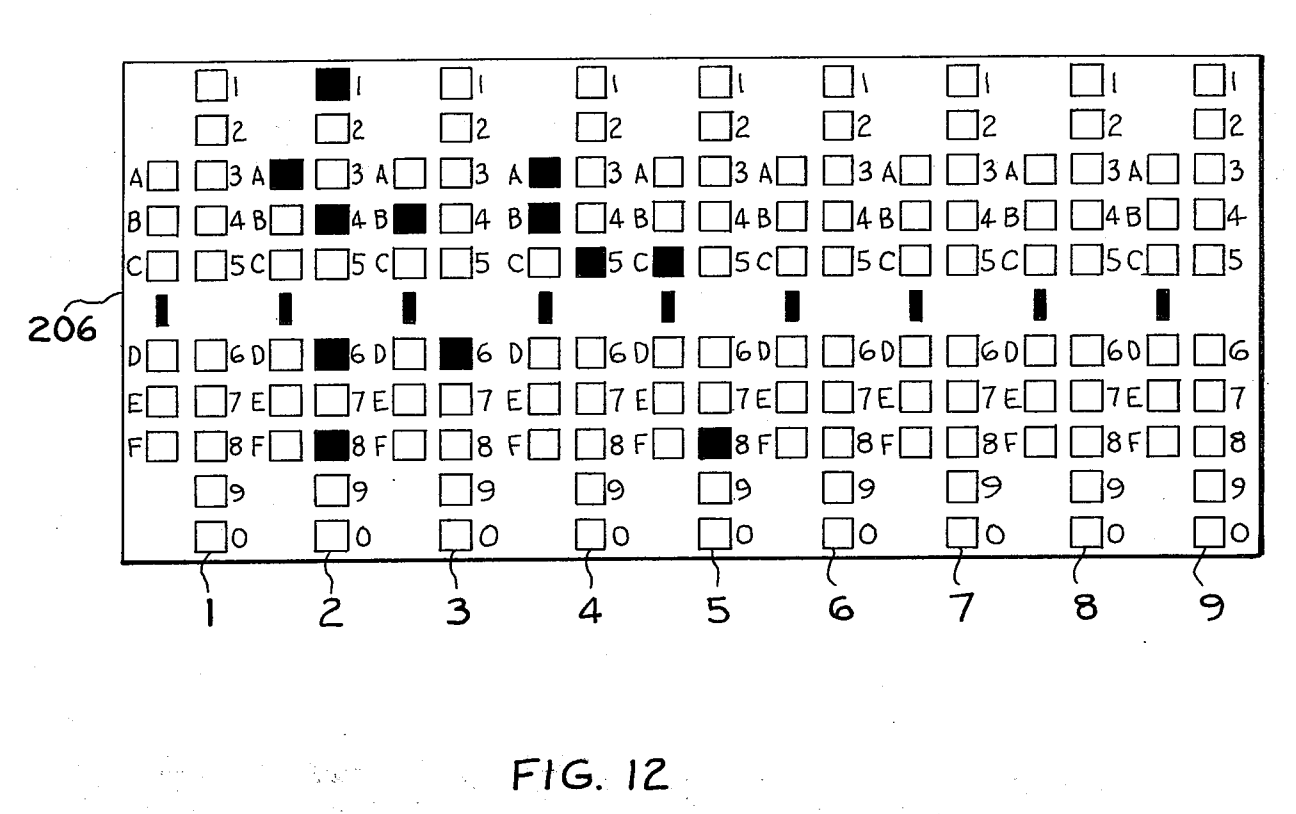

An optical card 206 may be read. Input data including the student option data and the teacher option data, as well as service option data, may be input through a card such as that shown in FIG. 12. Such cards are moved parallel to their long axis under a set of from 8 to 25 mark sensors (17 being shown in the figure) such as the SPX 1396-2 available from Spectronics Inc. of 830 E. Araphoe Road, Richardson, Tex. 75080. These devices detect the presence or absence of pencil or pen marks in the identified locations on the card. Each of the seventeen locations is sensed as a digital bit, these bits falling into three groups:

A. The clock bit which is narrower than all the others in the direction of motion, and is always dark;
B. The address bits A–F; and
C. The data bits 0–9. All bits are continually sensed, but data is not accepted by the control circuit unless the clock bit is read as dark. Thus since the clock bit's width is centered on the same center as all the other bits, but its width is less, the data will be read only when all the address and data bits are in position correctly. The data read is directed to one of 64 locations in memory by address bits A–F. The data bits 0–9 may be utilized either as toggle bits which turn on or off a specific function or option, or they may be used as multi-bit data to insert values of variables such as specific numbers describing student characteristics such as repetition requirements or timing requirements. A level of precision of such data appropriate to the information required may be obtained by using multi-group inputs. For example, a specific number up to 999 may be written by using one group each for the ones, tens and hundreds places. While this makes for very inefficient coding on the card, it is desirable for non-technical users. This input system requires no special equipment other than the cards themselves and a pencil with an eraser. The entire system may be thought of as a mode switch, switching the machine into a large multiplicity of alternate modes, the number of such modes being between $10^{64}$ and $4.56 \times 10^{192}$ utilizing the 17 bit system shown, the value depending on the mix of toggle type options and value input options.

Since the data is placed in a memory location determined by the code read at the same time from the data group, a given card may be coded to input only student options, thus becoming a student option input card. Alternatively a card may be coded to put in only teacher options. Further, a card may be used as a key for operators who have special functions to access various portions of the machine functions appropriate to their duties. For example, a teacher's aid might be given very simple controls to turn the machine on and off and throw it in the appropriate modes of operation with the student. Alternatively a serviceman would have a card and would be able to make his own codes, utilizing only a pencil, to access various portions of the machine memories to operate the machine in various special modes for service purposes.

VARIABLE FORCE HANDLE MECHANISM

Figure 6:
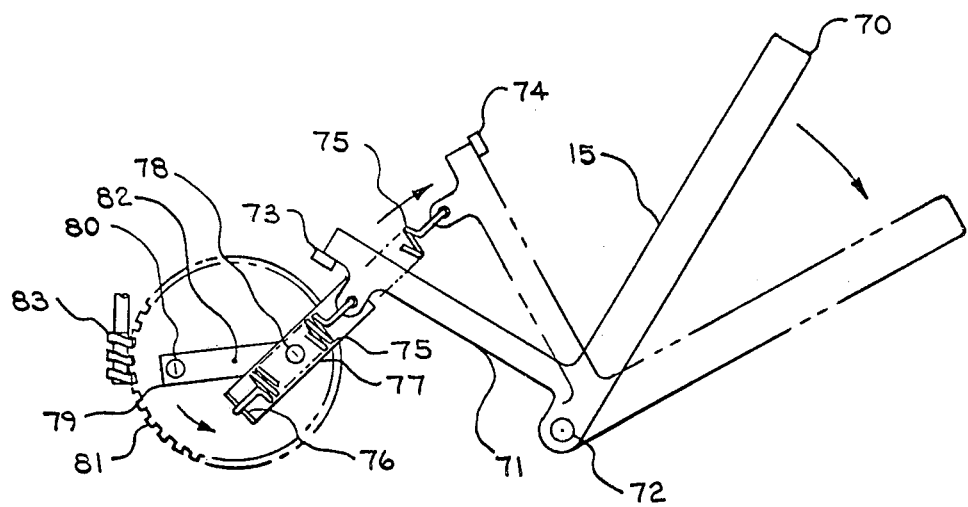
FIG. 6 is the handle pull variable force mechanism in its maximum force position.
Figure 7:
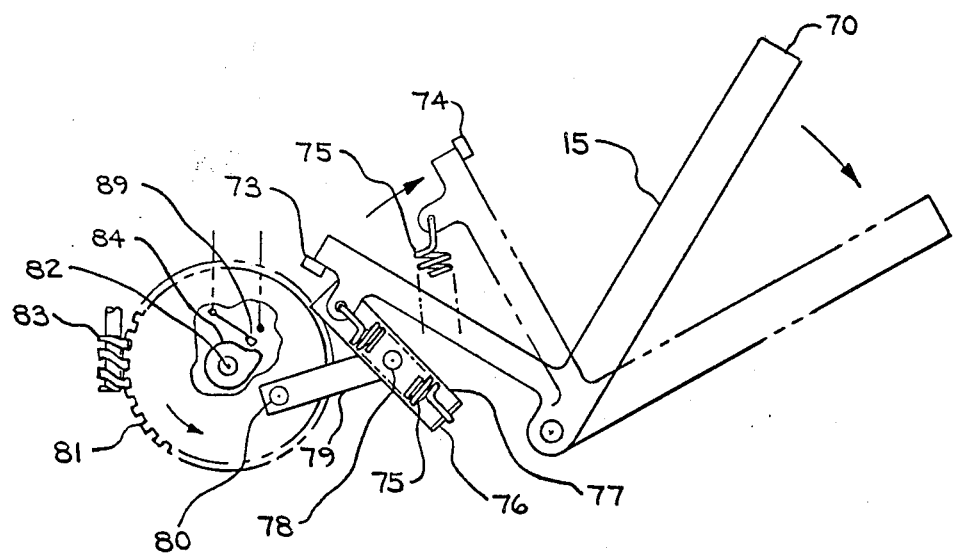
FIG. 7 is the handle pull variable force mechanism in a low level force position.

The detailed construction of the handle 15 is shown in FIGS. 6 and 7. The handle 15 consists of an exterior arm 70, which protrudes from the housing of the teaching machine and integral therewith, but at a right angle thereto, arm member 71. The arms 70, 71 are pivoted about a center 72. The arm 71 is moved between the stops 73 and 74 which are fixed relative to the housing 10. A helical coil spring 75 is connected near the outer end of the arm 71 and the other end of the spring is connected to a bracket portion 76 of a plate 77. The plate 77 is pivotable about its center 78, its center 78 being pivotly mounted on a second plate 79. The second plate 79, in turn, is pivotable about an end pivot 80 which is pivotly mounted to one face of a gear wheel 81. The gear wheel 81 is rotatable about its center 82 and is in mesh with a worm gear 83.

As shown in FIGS. 6 and 7, the rotation of the worm gear 83 causes movement, in this case counter-clockwise, of the gear wheel 81. Such movement changes the position of the pivot 80 which, in turn, changes the position of the pivot 78. Such movement of the pivots results in a decrease in the stretching of spring 75. Consequently, the rotation of the worm gear 83, by changing the positions of the pivots of the center 80 and 78, will either increase or decrease the amount of force necessary for pulling on the handle arm 70 to move the handle arm 71 between its stops 73 and 74. Stop 74 is also a switch which will indicate that the handle has been pulled, that is, that the handle arm 71 has been moved from stop 73 to switch stop 74. The worm gear 83 is mounted on a shaft which is rotatable by a motor controlled as follows: A cam 84 and switch indicate when wheel 81 is in such a position as to minimize the force required on handle 15. After this switch closes, the longer the motor is allowed to run, up to 180° rotation of geared wheel 81, the greater resistance the handle 15 offers the student. Thus, a digitally controlled time is assigned to the running of this motor by the timing and distribution control 111 to determine the desired student effort. The desired effort is in turn input to the machine through the student option memory discussed below. Once this period of time has elapsed after the contacts 89 have been activated, the motor is turned off. Thus the resistance of the arm is set to match the physical strength and psychology of the student, for the reasons discussed above under "AVIT Requires Physical Effort".

INTERNAL STRUCTURE

Figure 3:
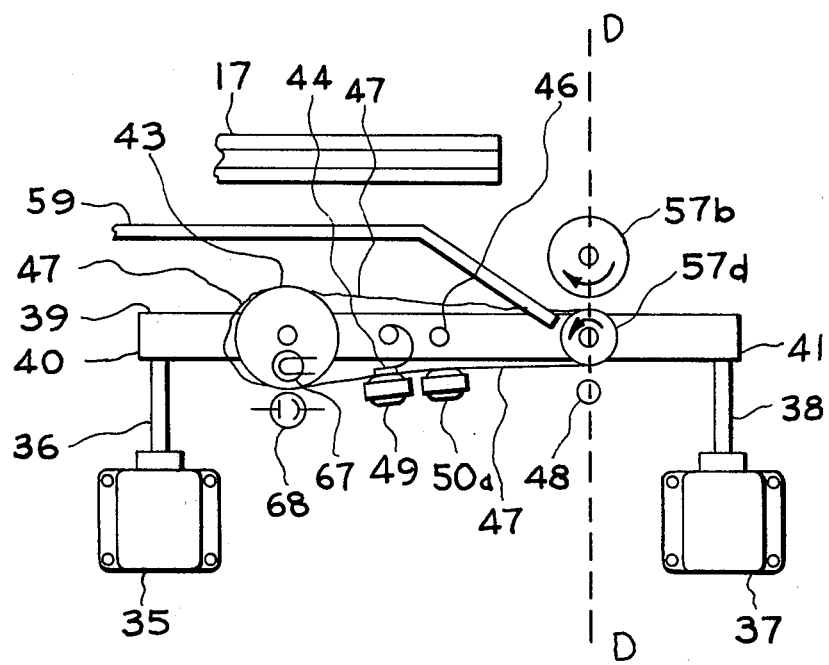
FIG. 3 is a section through the acoustic memory loop along section A—A (FIG. 2)

The Audio System will be considered first. FIG. 3, which is a section taken along A—A of a cross-section of the internal mechanism of the machine, shows the mechanism wherein audio information on the cards may be placed on a tape loop for subsequent replay. This mechanism, shown in FIG. 3, is used so that the audio output is time independent of the movement of the cards. The mechanism comprises a first solenoid 35 having a reciprocating output shaft 38. The output shafts 36 and 38 are connected to opposite ends of elongated plate 39 by means of upstanding brackets, respectively 40 and 41. The elongated plate 39 swivels about its center 46. A motor driven rotatable rubber roller 57b (which also drives the cards across the magnetic heads as shown in FIG. 4) is positioned over a freely rotatable roller 57d. The freely rotatable roller 57d and its accompanying fixed tape loop guide 43 are mounted on elongated plate 39 and drive a magnetic tape loop 47. A low-speed capstan 48 is also motor driven. An erase head 49 is positioned to operate against the loop 47. A magnetic reading and writing head 50a is also positioned adjacent the loop 47 to write and read information on the tape loop 47. A felt pad 44 together with the pulling of roller 57d draws the tape loop against the heads.

In operation, the withdrawal of shaft 36 by solenoid 35 (counterclockwise rotation of elongated plate 39 in FIG. 3) brings roller 57d into contact with roller 57b so that the magnetic card passing through the nip jaws of 57b and 57c–57d will drive the tape loop 47 at precisely the same speed (including variations) as the tape loop 47, insuring identical spacing between magnetized portions of loop and card, regardless of speed variations of both. This insures high quality data transfer from loop to card or card to loop. The microphone 14 (when the machine is in the program mode) records at the low speed, and similarly the playback to the earphones or loudspeaker 13 (in teach mode) occurs at this low speed. Alternatively the solenoid 35 may be non-operative and solenoid 37 is operated to withdraw its shaft 38 (toward the bottom of FIG. 3). Such movement brings roller 57d and the tape loop 47 which runs over it into contact with the low-speed capstan 48. This capstan maintains a very constant speed and thus recording (in the program mode) and playback (in the teach mode) occur at a highly controlled speed. It is noteworthy that during the transfer from loop to card (program mode) and card to loop (teach mode) the card actually drives the loop directly and thus their speeds are identical, insuring that the transfer of acoustic data will generate identical magnetic domain spaces from source to receiver magnetic oxides or vice versa, even though the speed is variable. Thus, only shifts of equalization produce errors in acoustic transfer, and these are insignificant. The position of the tape loop 47 is signaled by the passage of a transparent portion of the tape loop between the signal lamp 67 and the photocell 68, which signal is fed to the control circuit.

Figure 9:
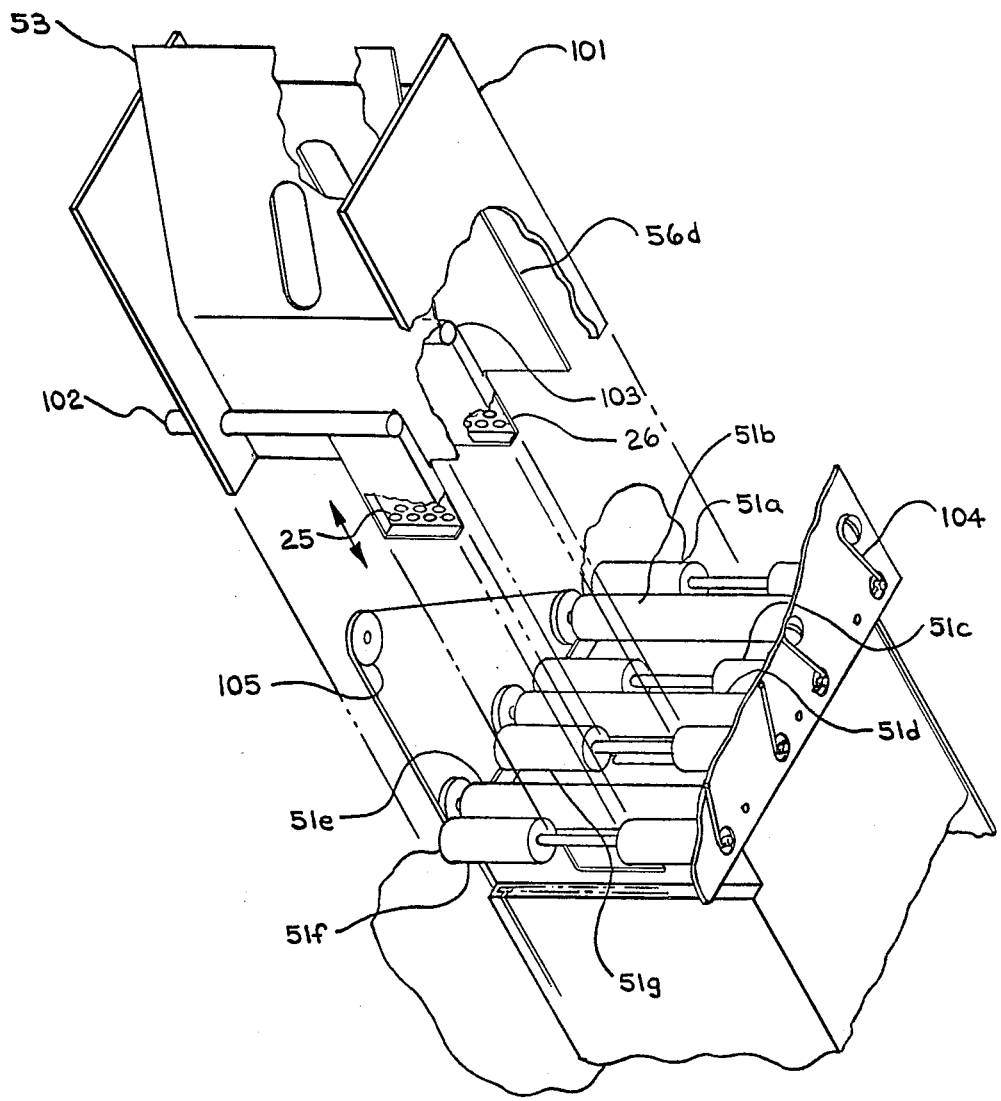
FIG. 9 is a perspective view of the picker and picker systems and their interface with the cassette to pick cards.

The Card Management System will be considered next. FIG. 4 is a cross-sectional view taken along sections B—B of FIG. 2. In FIG. 4 the inner cassette 30 is shown in place within the housing 10. The inner cassette 30 has three inner compartments, the topmost compartment 50b containing the reject cards, the center compartment 51h containing the active stack of cards, and the bottom compartment 52b containing the reverse stack of cards. The cards are picked from either the active stack 51h or the reserve stack 52b. The picker 101, shown in FIG. 9, is built and moves as a single unit having two hollow picker tongues 25 and 26 which have holes in their upper surfaces. On a pick command from the control circuit it moves to the right and into the cassette as shown in FIGS. 4, 5, 8 and 9. When the picker tongues 25 and 26 have reached their extreme right-hand extension extending into cassette cutaways 92 and 93 (FIG. 8) they come to a stop and the vacuum to either pipe 102 (reserve stack picker 25) or 103 (active stack picker 26, shown in FIG. 9) are turned on at the command of the control circuit. The bottom card of the reserve or active stacks respectively is drawn down to the picker which in turn, while the rest of the stack is held back by separator knives 58c or 58b respectively, on its return motion to the left, draws the card into the nip jaws of rolls 51f–51e or 51g–51d respectively from whence it passes on through the card guides to the nip jaws of 56b–56c and thence on over the heads 85, 86 and into the display position 200.

The stacking means, which stacks up each of the cards into, respectively, a rejected group 50b, an active stack 51h and a reserve stack 52b, comprises the compartments in the inner cassette. The mechanism consisting of the card pusher 60 which is linked to the card picker 101 by linkage arm 61, moves to the right when the picker is first activated. By this action it drives the card which is in the display position 200 into the nip jaws of the rollers 57a, 57b before a card is picked, since the picking action takes place on the left-hand motion of the picker. The returning card is then out of the way of the freshly picked card and will pass over the outgoing magnetic erase and recording heads 87 and 88 and into the nip jaws of rollers 56a and 56b, and thence on to the cassette 30.

Figure 10:
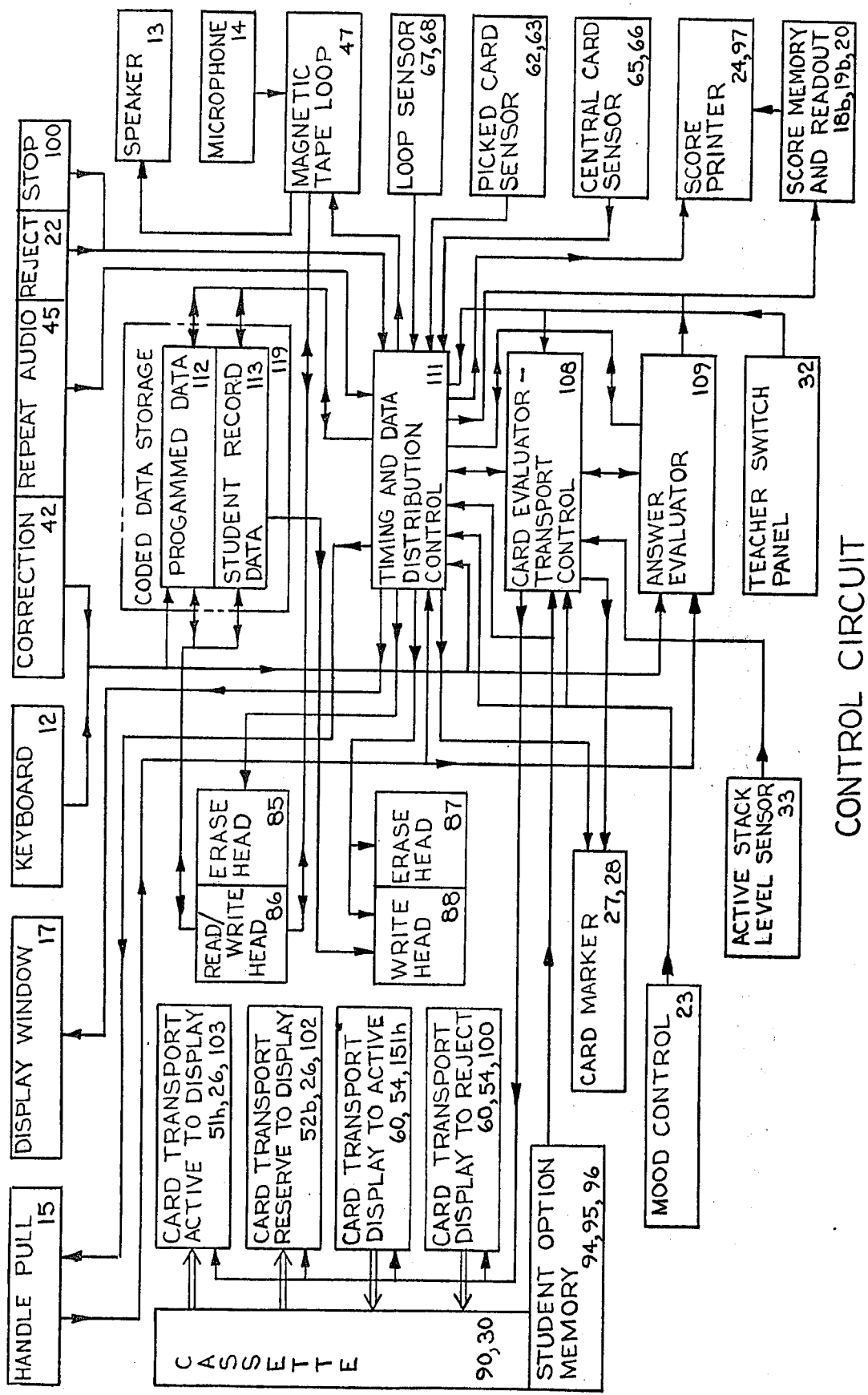
FIG. 10 is a block diagram of the control circuit.

After leaving roller set 56a, 56b, the card returning to the cassette 30 must be switched to either the top of the reject stack 50b or the top of the active stack 51h as directed by the card evaluator-transport control 108 (FIGS. 4, 10). This decision is implemented by a solenoid (not shown) rotating the card path switch 54, a card guide, which rotates around its axes 55 and rides against stops (not shown) which cause it to direct the card to the appropriate track. In the normal teaching mode, once a card has been directed to the reject stack 50b, the next card will be drawn from the reverse stack 52b so that a constant number of cards will remain in the active stack 51h.

Figure 2:
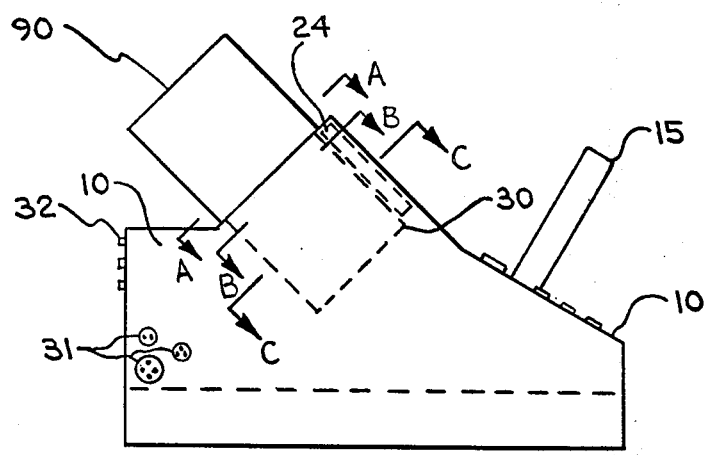
FIG. 2 is a side view from the left to assist in locating the later figures.

FIG. 5, which is a cross-sectional view taken along line C—C of FIG. 2, shows much the same structure as that shown in FIG. 4. However, in this case, instead of the magnetic heads and the card path switch, there are provided two lamp-photodiode sensors 62, 63 and 65, 66. Sensor 63 indicates to the control circuit when a card has in fact been picked and starts timing sequences for magnetic data transfers. Sensor 66 senses both the cards coming out of the cassette to the display position, and also cards returning from the display to the cassette. The card marking pencil lead 27 and its holder 28 may be seen in FIG. 5. This holder 28 rotates about its axis 29 under direction of the control circuit. The lead 27 can thus mark cards at selected places on their backs as they are being conveyed to the reject stack upon actuation of the lead holder 28.

The spring load service 34 above reserve card stack 52b serves to push the cards in that stack down against the picker surface, in case they are bent, so that the vacuum can get a grip on the card. The same function is carried out for the active stack 51h by the movable pushdown finger 33. Because of cards returning to the active stack, this finger cannot be permanently in position and thus it is moved up and down by a solenoid (not shown) so as to be up and out of the way when the returning card arrives. As the picker moves to the right the card in the display position starts on its way back to the cassette, but well before it arrives and before the picker reaches its full rightward extension the pushdown finger 33 pushes the cards down against the picker tongue 26 to assure an effective pick until just after the vacuum has been turned on, when it retracts in time to permit the returning card to enter the active stack 51h. The approximate number of cards in the active stack 51h is measured by the position to which the push down finger moves. This latter is a piece of information required by the control system as described below and as indicated in FIG. 10.

FIG. 9 is an oblique view of the roller-picker system. Rolls 51a, 51c, 51e, and 51f are not full rolls across the width of the machine as they are idlers; and the lack of a full roll on 51g allows space for the active stack picker tongue 26 to fit through under the cards and into the cassette cutaway 92 (FIG. 8). Similarly, the spaces permitted by roll 51f permit the reserve stack picker tongue 25 to fit under the reserve stack cards and into cassette cutaway (FIG. 8) in comparable fashion.

ELECTRONIC CONTROL CIRCUIT

The electronic control circuit consists of a general purpose microprocessor 130, FIG. 10, having input and output connections (ports) (see FIG. 10) through which it obtains information and transmits its responses to the outside world respectively. Its outputs consist of wires carrying logic levels to control various parts of the physical system. Such a system may be constructed from an INTEL 8008 microprocessor, available packaged from a number of sources, among them being Control Logic Co., 9 Tech Circle, Natick, Mass. Utilizing the Control Logic "L series" system, the appropriate units include a card cage CGL–532–8 which contains an LCP–593 central processor card, an LMA–595 memory address storage card, one or more LIO–594 input output control cards, an LDD–503 device address decoder card, an LBA–512 latch bus amplifier card, several LLO–515 latched output cards, several LBI–511 busports, and other interfacing logic appropriate to the system as is normally designed by all users of such systems.

The input ports include the following: (1) the keyboard output; (2) output from alternative response sensors; (3) input unit status bits such s the signals generated by the lamp-photocell sensors mentioned above indicating card and loop positions and timing, as well as bits indicating the status of all front panel controls and all internal activities; (4) student option memory input, either from the peg and magnet system described or from an optical mark sensor used with an optically read card; and (5) magnetic card data from the magnetic playback heads. In addition, inputs are received from systems external to the machine proper through connection 31 where they have a need to communicate with the control system as described below.

Outputs include lines to all lamps 116, 117, 118, 119 as well as the elapsed time 18b, number done 19b, and number correct displays 20, the printer 24, the character display 205 and the magnetic card recording heads 85, 86, 87, 88, 49, 50a. Switching and control lines go to all acoustic acquisition and playback apparatus as well as to digital recording and playback systems for communication with the card magnetic oxide memory, the liquid crystal window segment 17, 18a, 19a opacity controls, as well as control lines to the picker 101 and the vacuum supplies 102, 103, card diverter 54, and card marker 28. Outputs are also required to systems external to the teaching machine proper with which the machine communicates as a part of the teaching or testing process, as described below.

If needed, temporary mass storage of data concerning test results for a number of students can be accomplished through a digital magnetic tape cartridge system such as that available from Microcommunications Inc., 680 Main Street, Waltham, Mass. Input and output ports for communication with this system are required, the data on student reactions being stored on the tape in greater detail than on the cards. Input and output ports are required for communication over telephone lines through MODELS (such as that produced by Anderson Jacobson Inc. of 213 Middlesex Turnpike, Burlington, Mass.) of serial data interfaced by such a serial interface as the control logic LSI–599 card to large scale general purpose computers such as the Xerox Sigma Six machine at the University of Vermont, Burlington, Vermont. Input and output ports are also required in some applications where the operation of the teaching machine meshes with other systems through connectors 31 which affect machine behavior patterns. Such outside systems include systems which generate information about the user's responses such as electroencephalograms, galvanic skin responses and sentic sensing systems. Such information may be used to affect the response sensor or to replace it, or to provide additional inputs to the learning algorithm. Such outside systems may also include apparatus about which the student is being taught, where responses by the student are acts concerning said apparatus, with responses from the apparatus acting as the input to AVIT of a response sensor through connectors 31. In this instance, outputs through connectors 31 from AVIT may control conditions in the external apparatus in accordance with the teaching program as carried on the cards as a part of the "rules for interaction" data section 112.

The programs for the 8008 microprocessor may be assembled utilizing the "8008 Macro Assembler" (MAC8) available on most large scale time sharing computer systems such as the Sigma Six Computer at the University of Vermont. Such programs may be structured as a set of sub-programs managing various aspects of machine operation combined with main line programs for Teach Mode, Program Mode, Test Mode, Data Transfer Mode (the teaching machine acts as a simple terminal to connect to a large scale computer, and then transfers its stored data to the computer). Utilizing this structure, various portions of the program can be held in programmable read-only memories (PROMs) with changes in the overall machine behavior pattern being made for particular applications by changing a small amount of PROM containing the main line programs.

The programs required for this microprocessor are most easily understood in terms of the machine operating functions described below under Operative Behavior.

THE MATRIX WINDOW AND ITS CONTROL SYSTEM

Figure 14:
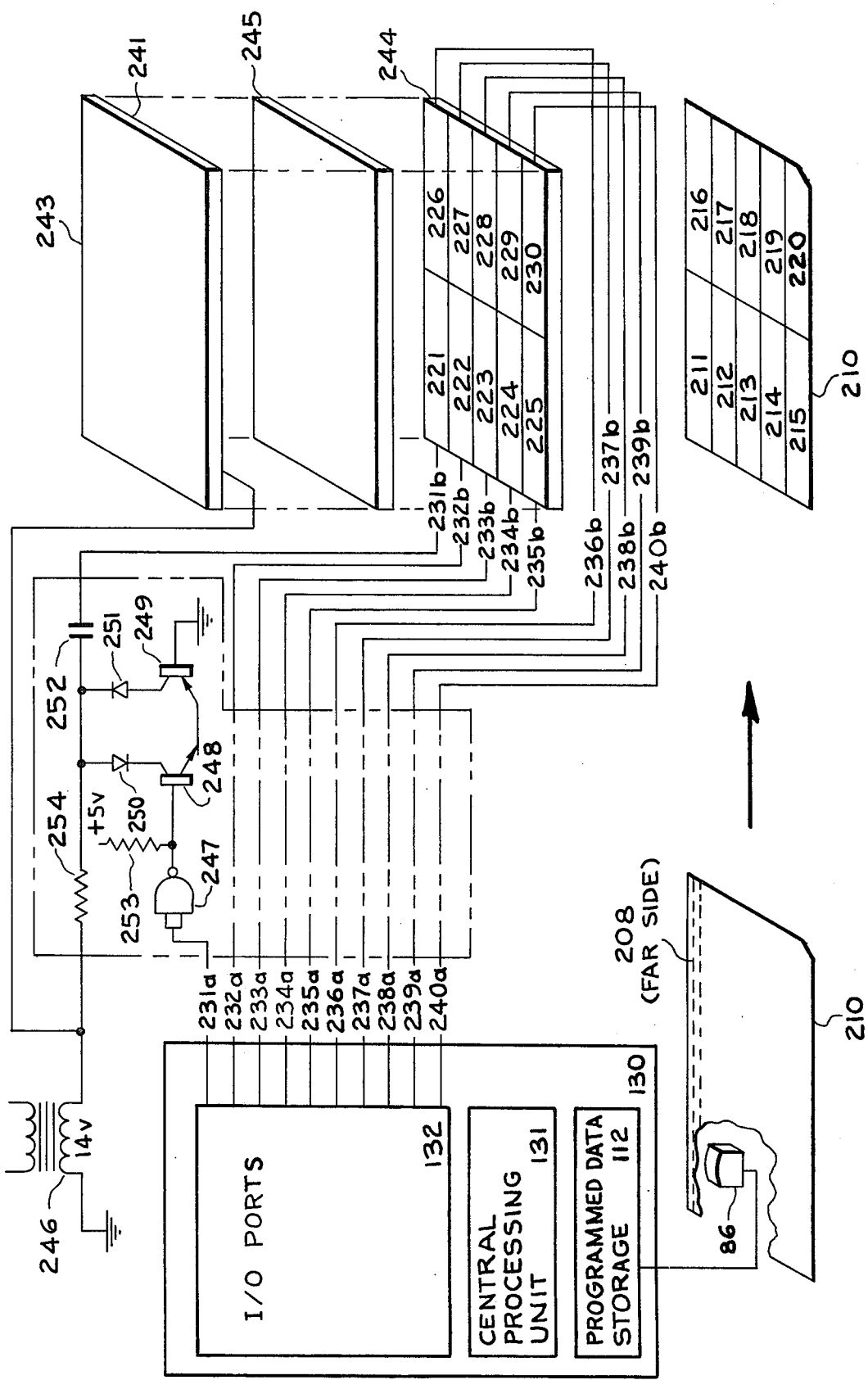
FIG. 14 is a conceptual view of the liquid crystal matrix window, its drive circuits, the card its displays, and the information paths to control that display.

A device utilizing a liquid crystal with electric field control of transparency is well known to practitioners of the art. Such devices consist of a polarizer such as 243 in FIG. 14 whose direction of polarization is at 90° to a second polarizer 244 shown in FIG. 14, each of which polarizers has a conducting transparent material deposited on its side closest to the other, 241 on 243 and the combination 221 through 230 on 244. In practice 243 and 244 sandwich 221–230 245 and 241 between them, and the whole is assembled as a single unit. The segments 221–230 may be treated individually as defining different windows in the total system. Thus there are 10 such rectangular windows in the total system. Light coming from above passes through polarizer 243 and the associated electrode 241 and the liquid crystal 245 and arrives at the second transparent set of electrodes such as segment 221, passes through that segment and then arrives at polarizer 244 which has its plane of polarization perpendicular to the plane of polarization of the light defined by polarizer 243. The light therefore does not pass through 244 and the segment on the card 210 lying below 221, namely 211, is not visible from above. If now a voltage is applied between electrode 241 and electrode 221 the liquid crystal 245 changes the nature of the polarization so that the light passing through segment 221 also passes through polarizer 244 and on to segment of the card 211, thus making segment 211 visible. The liquid crystal window, which has a relatively short life when driven by DC compared to a very long life when driven by AC, is preferentially AC driven. Capacitor 252 assures that the AC component alone is applied to the segment 221. Transformer 246 of the drive system drives electrode 241 at an AC potential, for example, 14 volts. The electronic circuit shown causes wire 213b to stay approximately at ground potential (within three diode drops or 2 volts) so long as the output of driver gate 247 is at TTL logical 1. The driver IC 247 (Texas Instruments Type SN 7438) is of the open collector type and the resistor 253 pulls the base of transistor 248 positive which in turn pulls the emitter of transistor 249 positive with respect to its base which is grounded. Thus, when wire 242 is positive, both transistors are turned on and diode 250 is conducting, thus holding line 231b within the three diode drops (249, 248 and 250) of ground. When wire 242 is negative, diode 250 turns off and diode 251 goes into conduction as does transistor 249, again holding the line 231b close to ground, i.e., in this case two diode drops from ground. When the output of gate 247 is at logical 0, neither transistor 248 nor 249 has the required bias voltage and thus both are open circuits. Thus, no current flows through the load resistor 254 and thus lines 231b and 242 are at the same potential. Therefore when line 231a has a logical zero, electrode segment 221 and electrode 241 have no voltage between them and the liquid crystal sandwiched between them does not modify the incoming light, so no light passes and segment 221 of card 210 is invisible. Comparable driver circuits are connected to all segments 221 through 230 of the liquid crystal window. The segments in turn control the visibility of segments 211 through 220 of the teaching card. The logic levels on the individual input wires such as 231a control the transparency of the liquid crystal window segments such as 221 and in turn the visibility of the card segments such as 211. In like manner 232a controls the visibility of card segment 212 while 233a controls the visibility of card segment 213 and 240a controls the visibility of card segment 220.

The lines 231a through 240a are TTL logic levels which are output by the output port 132 which may be an INTEL 8212 integrated circuit. Such I/O ports handle 8 bits each and thus more than one is required for the 10 control bits required for the 10 segments. Each such 8 bit output port outputs one word of information from the computer. Thus one word of 8 bits and an additional 2 bits from another word control the transparency of all segments of the window concurrently. The information concerning this control is normally a complex interactive programming function depending upon the learning state of the individual and the material he is being taught. All of these output lines are under the control of the microprocessor system 130, containing the central processor unit chip 131 which may be an 8008 or 8080 CPU, available from the Intel Corp., which is connected to memories, input output devices, etc., in the usual fashion through its bus structure. Nevertheless a very simple control could operate as follows:

On the transit of the teaching card 210 from the cassette 30 to the display position 200 the magnetic digital strip 208 on the back of card 210 rides over the read-write head 86 which reads the digital data and feeds it to the micro-processor which in turn directs it into the program data storage section of memory 112. This data would, in such a case, consist of 2 words of 8 bits each. At the time during the teaching program in which the particular transparency and opacity pattern is to be exercised, those words are fed from the program data storage 112 through I/O port 132 to the window to achieve this result.

Operative Behavior
MECHANICAL CYCLE

The decision by the control circuit to pick a card, for example, from the active stack, initiates the following train of events: First, the picker motor (not shown) is activated and drives the picker 101 reciprocatingly first to the right, as seen in FIG. 9, and then back to its rest position on the left. While the picker is at its extreme right-hand position in the active stack vacuum solenoid is energized and supplies a pulse of vacuum through pipe 103 to tongue 26. This tongue 26, by means of the vacuum applied to the card through the holes in the tongue, then grips the bottom card of the active stack 51h, pulls that card down so as to pass under the separator knife 58b (shown in FIG. 5) and pulls it to the left until it is caught by the actively motor driven roller 51d and its spring mounted idler roller 51g.

The conveyor means used to transport the cards includes the picker rolls which are machine rotatable rollers aligned from top to bottom as rollers 51a, 51b, 51c, 51d, 51g, 51e and 51f, see FIG. 4. The cards slide along guides, some of which, 53, 56d, are parts of the picker mechanism itself and thus move with the picker mechanism. The guides 52a, 58, which consist of two plates having a slit between them, are the only fixed guides, see FIG. 4. The bottom guide 53 (which guides the cards from the reserve stack 52b) and the active stack guide 56d also serve as structural members of the picker and thus move with it. Both of these members/guides (53, 56d) are slotted by slots 53' and 56d' respectively, as shown in FIG. 9, to permit the passage of a sensing light beam from lamp 62 to phototransistor 63, as seen in FIG. 5. This beam will be broken by any card picked from either the active stack 51h or the reserve stack 52b, but will not be affected by cards returning to the active stack 51h or the reject stack 50b from the display position 200. Thus, the interruption of this beam indicates to the control circuit that the picker mechanism has in fact picked a card which is on its way to the display position. The control circuit then activates the solenoid 38 (FIG. 3) after an appropriate delay to accelerate the tape loop 47 up to speed. Thus, both the card and the tape loop are locked to roller 57b are running synchronously when acoustic information is transferred between card and loop.

When the leading (left hand edge) of the card emerges from roller set 57b and 57c it strikes the display card guide 59, rides up on the curved portion of the card guide 59, and is directed between the display card guide 59 and the display 17 until it is in position between these two members and up against card return pusher 60. This is the display position 200 for the card where its own stiffness holds it flat, even though the card is unsupported over the curved right-hand end of the display card guide 59.

During the final motion of the card into display position 200 the tape loop 47 came to a halt as the transparent portion of the loop where the splice was detected by the photocell 68 cooperating with lamp 67 of FIG. 3. As soon as the tape loop has terminated its high-speed record mode, it is usually retriggered by the control circuit in the low-speed playback mode. Thus AVIT plays back the freshly recorded message through the loudspeaker 13 at the same time that the optical presentation to the student occurs by virtue of the presence of the card in the display position 200 behind the display window 17 through which the card can be seen by the student.

In modes of operation other than the teach mode, the same sequence of events takes place mechanically but the directions of data flow, and the uses the data is put to, change.

AVITS's INTERNAL INFORMATION TRANSFER

The card picker mechanism 26 ordinarily picks cards from the "active stack" 51h and the card conveyor mechanism 51g, 51d, 56b, 56c, 57b, 57c, 59 in the process of bringing them to the display position 200 transfers all the digitally recorded data on the back of the card to AVIT's temporary memory the coded data storage 110 by means of magnetic head 86. AVIT functions on a short-term basis in its interaction with the pupil on the basis of this transferred information in its internal memory 110. Some of this data is a record of student performance, so that AVIt "reminds itself" of the student's past record when it reads the card. As AVIT interacts with the student on the basis of an individual card, it builds up further information about the student's response to the questions on that card, which it uses to modify its internal memory 113 of the student record. As the card is returned to the cassette the old student record on that particular card is removed and the digital record contained in the machine's temporary memory of the student record 113 is transferred to the card, so that the next time that card appears AVIT will have an up-to-date record on pupil performance in memory section 113, including the student's most recent responses to the questions on that card.

In the programming mode data flows from coded data storage 110 and loop 47 to card while in the teaching mode the transfer is from the previously recorded card back to the loop 47 and the coded data storage 110. The loop 47 is run at low speed to record from the microphone 14 during the programming process, while in the teaching mode the loop is played back at low speed through the loudspeaker 13 or the headphones to the student.

The programmed data located in memory location 112 of the coded data storage 110 also affects information transfer of various kinds becuase of its control over the behavior of the timing and data distribution control 111. An example is the control of those portions of the card which may be seen through the display 17 as the transparency of various portions of that display 17 are changed. The various divisions of the display correspond to locations on the card 210 shown in FIG. 13 and numbered 211, 212, 213, 214, 215, 216, 217, 218, 219, 220. Thus this control permits selected information transfer to the student based upon which portions of the card he can see.

During passage from right to left over erase head 85, old digital and acoustic information recorded on the magnetic strip on the card is removed in the program mode but not affected in the teach mode. At the same time, the acoustic information is being transferred between the card 210 acoustic channel 209 by head 86 and the magnetic tape loop 47 by head 50a in both program and teach modes. During the first part of the passage of the card from right to left over head 86, digital indicia concerned with the item being taught are transferred between the card 210 digital track 208 and the control circuit, namely, the programmed data portion 112 of the coded data storage memory 110 (FIG. 10). This data is transferred from the programmed data section 112 of the coded data storage 110 onto the card during the program mode, flowing in the same direction as the acoustic data. This digital data is accommodated on the left-hand part of the digital track 208 on the card 210. The right-hand portion of this digital track 208 is separated from the left-hand one by a distance greater than the spacing between return heads 87 and 88. At this right-hand portion of the digital track 208 on the card passes over head 86 in the program mode, this portion of the card is reformatted. During the teach mode the head 86 is utilized as a read head and the information on the left-hand portion of the digital track 208 flows in the opposite direction, i.e., from the head to the programmed data portion 112 of the coded data storage 110. The right-hand portion of the digital data track 208 is not changed as the card moves from right to left during the teach mode, but the data is transferred from the card 210 to the student record data portion 113 of the coded data storage 110.

During passage from left to right the card which was previously in the display position 200 after passing between the rollers 57a and 57b, passes over the erase head 87 and record head 88 before passing to the nip jaws of rollers 56a and 56b. The erase head 87 is used in the teach mode only to remove previous data from the right-hand portion of the magnetic recording strip 208 (digital track or channel), which data, however, had previously been stored in the student record data portion 113 of the coded data storage 110, when the card went to the display position. The write head 88 is using during each mode only to transfer the updated contents of the student record data portion 113 of the coded data storage 110 onto the same right-hand portion of the digital track 208. Thus, when the card 210 came from the cassette 30 to the display position 200, magnetic informaton on it was transferred to three temporary memories, the acoustic information on track 209 being transferred to the magnetic tape loop 47, the left-hand portion of the digital track 208 being transferred to the programmed data portion 112 of the coded data storage 110, and the right-hand portion of the digital data track 208 transferred to the student record data portion 113 of the coded data storage 110. The contents of the tape loop 47 and the programmed data 112 are used in interacting with the student while the card is in the display position 200 and the results of that interaction become an update of the student record which is stored in the student record data portion 113 of coded data storage 110. This updated student record is then transferred back to the card 210, 208 for future use as the card goes back to the cassette, while the other two types of information are overwritten in the storage registers as the next card comes in, but remain available for future use on the card 210, 208 which was returned to the cassette.

Automatic Old Student Record Erasure is a function which makes it possible for the teacher to re-use cards which have already been used by one student (and thus have a student) record on them) without carrying out a processing of the card to prepare it for the next student. When the teacher loads used cards 210 with inappropriate student records 208 on them into the reserve stack 52b, the assumption may be made (under teacher option control) that the fact that they came from the reserve stack zeros the student record in 113, and the incoming student record is ignored. When the card is returned to the cassette the student record then in the memory location 113 is re-recorded on the card 210, 208 over the old student record, which is thus destroyed. Various other behavior patterns are possible through control of the teacher option memory to accommodate different learning situations. An example is the desire to give the student a review session, and the cards from which the student originally learned are available with his record on them. In this case, it may be desirable to make use of the records 208 on the cards 210 in the reserve stack. Further extensions of this type of processing are discussed under Long Term System Memory.

Long Term System Memory is accomplished as follows. A student, having finished one session with AVIT, will come back to the machine at a later date and AVIT should be able to interact with him appropriately at that time. There are several options as to how it behaves in such a later encounter, depending on the teacher option memory and the condition of the cassette, which presumably has been processed in the meantime by the teacher.

a. The cards 210 may remain in the same stacks and then the cassette in the machine simply continues on from the point where it was previously, all records of student performance being unmodified.

b. Normally students will have done some forgetting between their sessions with AVIT and thus the student record which is on the cards gives the student credit for a greater level of memory than is in fact the case, i.e., more "overlearning" is required to make sure that the items remain fixed in memory. This effect can be compensated for by the following machine behavior: The reinsertion of the cassette can be used as an indication that a period of time went by since the last session, if all of the cards 210 have been removed from the active stack 51h and placed in the bottom of the reserve stack 52b. AVIT learns that time has gone by since this student's last session with it through trying to pick from the active stack a finite number of times, four, for instance, and then going on to pick from the reserve stack 52b. It is useful to have AVIT capable of learning this itself, so that the teacher does not have to put a different teacher option in for each individual student to indicate time has passed. The mere act of switching the cards from the active to the reserve stack while checking over the student's work is sufficient to cause AVIT to correct for the interim forgetting. AVIT knows, from the student option memory, how many cards should be in the active stack. It may use these two pieces of information to modify the student records on the cards in the active stack (the first N of them, if N cards are supposed to be in the active stack but start off in the reserve stack) so as to decrease the student record's evaluation of the learning level on these cards.

c. If another piece of information is added to the above, concerning the time which has passed since the last learning session, a more precise modification of the student record may be made. Elapsed time information may be made available to the learning algorithm by the following process: If the teacher option memory carries the date, and this date is always recorded on the card as a part of the student record 113, then when the card next appears the old date is still on it while a new date is available from which to calculate the elapsed time.

AVIT'S USER RELATED CONTROL FUNCTIONS

The "show error button" 120 throws the machine into a mode of operation in which the first error which is made in putting in the answer will light the error lamlp to assist the student in finding out where he made his error.

A rubout key on the keyboard deletes the last symbol from the answer each time it is activated. This action is made visible through the answer display 205. For more serious errors where the entire answer is to be removed, the correction button 42 is provided.

The "replay audio" button retriggers the playing of the tape loop 47 so that the student may hear again the acoustic portion of the question.

The Stop Button 100 is required because the machine does not normally come to the end of a program in the teach mode. This is due to the cycling nature of the active stack which provides so many consecutive items (most of them repeated) that insufficient time exists during any one session to come to a stopping point; thus the student normally calls a halt when he has had enough for one session.

The Hint Please Button 121 is inactive until a time has passed since the card was presented, this time being controlled by an algorithm taking account of both the student and the item, much like others described above. When it can be activated, during the first presentation of the question, it gives a hint, either by opening a new section of the liquid crystal window behind which the hint is hidden, or it may play back a second track on the acoustic loop which contains the hint, or both. Successive activations of this button may switch from one mode of hinting to another, as is appropriate to the question and the number of available window sections and tracks in the particular model of the system.

There are two Reject functions the first of which is "reject with cause" or "I know this" which the student utilizes if he is convinced that he knows the item and does not need to go through the regular cycling process so pushes button 22. The other case, "reject without cause", occurs when the student has difficulties with the particular item, i.e., cannot seem to get it correct and wishes to get rid of it and not see it again, so pushes button 21. In either case, he pushes the appropriate reject button during the period of time when the care is being presented to him.

If he does, in fact, give the correct answer after pushing the "I know this" or "reject with cause" button 22, the last act of giving the answer is the pulling of the handle. The card is immediately transported to the reject stack but on the way there the card marker 27, 28 is activated and places a pencil mark on the back of the card in a space selected by the timing of the activation of the marker with respect to the card position. Should the student have entered a wrong answer after depressing the "I know this" button 22, the machine does not accept the reject, lights the "wrong" lamp 118 and recycles the card into the active stack 51h after showing the right answer momentarily by means of the display window 17, as would have been done for a correctly done card. In this case the "number done correctly" display 20 is not incremented.

When the "unconditional reject" button 21 is activated, the card is immediately transferred to the reject stack and marked in a different place to indicate the nature of this reject. Such cards marked as unconditional rejects constitute information to the teacher as to the items where the student is having problems. They indicate where the machine has gotten beyond its depth in the handling of the student and the teacher's attention is needed, which is the purpose of the marking process.

Time pressure and options concerning it are a fundamental part of the psychological milieu required for effective learning. To prevent daydreaming, it is possible to set times for the machine after which the correct answer is no longer accepted, and thus scoring pressure is applied to the student. Another type of time period which may be used to exert pressure is the time during which a display occurs, which again must be associated with the time required for the material to be presented and must also depend on the student's abilities. Various times for the various stages of the machine-student interaction may be assigned to fit the timing pattern to the student. In addition, these times may be different for the same student for different types of materials, so that the algorithm which calculates this time functions much as the learning algorithm described above, making use of multiple inputs.

The learning algorithm was discussed briefly in the summary, and the example H=C/E−(100*((-B−A)/B)−D)*100/G(F) was given as a possible, albeit somewhat oversimplified, format for a learning algorithm. The purpose of this algorithm is to decide the state of the student's learning of a particular item (card) at a particular time, and from this to generate a decision as to whether or not that card is to be repeated more, or whether it has been learned adequately. In the latter case, the card diverter 54, 55 is to be activated and the card transported to the reject stack 50b instead of the active stack 51h. Thus the learning algorithm simply determines whether or not the card diverter is to be activated. A positive value for H leaves the diverter 54, 55 directed to the active stack 57b while a negative or zero value causes activation of the card diverter and deflection of the card to stack 50b as determined by the microprocessor 130.

The learning algorithm receives data as follows: We assume that a card is in the display position, having been processed through the active stack for some number of cycles previously, and hence having built up a student record which was placed in memory locations 113 as the card came into the display position 200 and passed over the read head 86 from which the data were obtained. During its passage over the read head 86 the "Rules for interaction" mentioned in the summary were a portion of the data placed in the programmed data memory location 112. This location also received the correct answer from the digital track 208 of the card 210 in passing over head 86. The setting from the "mood control" 23 is directly input from the front panel. Various data are input from the teacher option memory, regardless of whether it was loaded from the simple switch panel 32, or a magnetic card 210 containing digital track 208 which is fed through the normal card handling process, or the optical card 206. Other data are input from the student option memory, regardless of whether it was loaded from the peg and magnet system 94, 95, 96, or a magnetic card 210 containing a digital track 208 (a different one from the teacher option card, of course), or from an optical card 206. The most recent answer is also available from the keyboard 12, along with data on the use or non-use of the "hint please" button 121 and internal data on whether or not this is the first try at giving this answer on this particular pass of the card, and other pertinent data affecting the answer evaluation.

Some Answer Responses Come From Outside the machine and may be input through the connectors 31. Such data may actually constitute the response of the user to the system in place of the keyboard, and would thus go into the answer evaluator 109, or they may be inputs which influence the evaluation of the learning process by indicating the user's momentary ability to learn. Thus if a student is paying very good attention, his brain waves will exhibit a particular frequency range which can be detected by outside instruments. Such instruments are available as models 1635, 1652, 71809, 42194, 1655, 1656, 19199 from the Edmund Scientific Co., Barrington, N.J. The fact that the student's attention is good means in turn that he will need less repetition. Thus an input to the learning algorithm from such a system is appropriate. The same type of inputs may be obtained from the galvanic skin response and from Sentic sensing systems (Sentics: The Touch of Emotions — Manfred Clynes, Doubleday), although the Sentic system is far more specific as to type of emotion detected. Where such specific information is available, an interactive relationship between the material being learned and the emotion of significance may be necessary in the learning algorithm, comparable to the relationship between G and F discussed in the summary and below.

AVIT may control external systems as Response Sensors and Stimulators. For example, if a telephone central office equipment service trainee is to be trained in the use of the central office equipment and its malfunctions, AVIT may be connected to that system to cause it to function in fashions appropriate to the item being discussed in the program. In such a case, the "rules for interaction" on the card will include data for a "device handler" subroutine to connect AVIT to the system. This would permit AVIT to put the system in particular modes of behavior, and to intepret the system's responses to the student's actions as responses to AVIT. This response is then fed into the answer evaluator 109.

The Learning Algorithm Decides whether or not the card is to be rejected on the basis of the following data, where the letters of the paragraphs correspond to the symbols in the formula for the simple learning algorithm given above.

A. A record of the number of times the particular item was done correctly in location 113. Also the state of correctness of the student's most recent answer is available from the answer evaluator 109. As mentioned in the summary, value judgments as to what is "right" are provided in the "rules for interaction" which are part of the programmed data in memory location 112 since they were carried on the card. Because educators may wish a "gray scale" of correctness rather than a right vs. wrong indication as indicated in the summary under "Recall Answer Evaluation", an algorithm somewhat more complex than that suggested may be appropriate.

B. The total number of times the item was done is a very simple indication of past history when combined with A. Instead, in a more sophisticated algorithm the actual order of correct vs. incorrect answers, or a running indicator representing that order, might be included. Such complexity poses no problems for the microprocessor and very little expense in ROM.

C. The difficulty of the item to be learned, again carried as a number in the programmed data memory location 112.

D. The period of time since the last interaction of the student with this item (which implies the degree of forgetting which has occurred in between), determined from the date which is a part of the student record carried by the card and loaded into memory location 113 as well as the present date available from the teacher option input.

E. The student's momentary mood as input from the mood control 23 where in the algorithm discussed here E is a positive number which is larger for a euphoric person than for a depressed one. The actual value falls on a scale between depression and euphoria. Equivalent statements would be requests for "take it easy on me I feel rotten" and "I feel great, let's work extra hard today", respectively.

An additional input to E, averaged with it in an appropriate manner, can be the input from any physiologic sensing system which leads to insight on emotional condition. Such inputs come through connectors 31 and can include output from an EEG sensing system, from a galvanic skin response sensing system, from a Sentic system, or other such external systems, as mentioned in the summary under "Data inputs to the Machine" and above.

F. The learning area in which the item to be learned fits, as indicated by the "rules for interaction" carried by the card and transferred into the programmed data location 112.

G. a series of repetition numbers, each associated with a "learning area" (as indicated by F above) which give the relative amount of repetition required by this student in this learning area in order to achieve a certain level of proficiency, is available from the student option memory.

On the basis of the set of numbers given above, or a portion of them, and a learning algorithm, which may be either much more or much less sophisticated than that indicated, AVIT decides whether or not to reject the card by activating deflector 54, 55.

AVIT's EXTERNAL BEHAVIOR

The Programming Process consists of having the programmer record information on each card by using AVIT's keyboard and microphone to (a) type the correct answer; (b) speak into the microphone or use other sound inputs to make the acoustic recording; (c) enter numbers defining the time required for answering this portion of the item on the card, the difficulty of learning the item on the card, a code by which the display pattern on the display window is to be made transparent and any special timing thereof; (d) enter codes for the sequencing information concerning the machine's responses after another card is completed and codes giving information concerning the student's interaction with the card and AVIT's interaction with any external system. The machine is then switched to a portion of its mode of interaction with the student (teach mode) so that the acoustic information is played back, the various timing options are exercised, and in general the programmer experiences the results of his programming in order to check it out. If the programmer is satisfied with his results so far, he then has one of two options: If this is to be a card with a single correct answer, i.e., where only one group of segments 211–220 on card 210 are to have their opacity controlled, while the others stay transparent to show the question, and these are to be switched as one unit, then he orders the numbers of copies of the card he wishes made utilizing a control character on the keyboard. This command starts the production process as described under "AVIT Programs Cards" below. Alternatively, if the programmer plans to use a number of segments of the card at different times in his program, then he utilizes another control character and increments the machine to the next element of the correct answer and associated information as above, and the same process is repeated. This process continues until the programmer has all the information to go on this one card entered into the machine memory. He then uses another control character to indicate he is ready to check over the entire card's mode of interaction and the machine then starts with the beginning of the set of entries and follows the sequencing and other information in its interaction with the programmer to check these out. If the programmer is now satisfied, he utilizes another control character to call for the production process.

AVIT programs cards as follows:

The active and reject stacks are empty while the reserve stack is full of cards to be programmed at the beginning of a programming session. After the machine memories have been loaded as above, the machine picks a reserve card and, as it is transported to the display position 200 the card 210 is first cleaned (all previously recorded information on the card is erased) and then all the information from the internal memories is transferred to the card. The card is then sent to the reject stack 50b. Another card is now picked and the identical process repeated. This process continues until the number of cards ordered has been made. Next, a new programming process starts for another card which goes through the same procedure. Previously, or subsequent to this process, the programmer must write or print the material onto the face of the card which the student is to see. This written or printed material must be so placed as to match up with the various segments of the display 211–220 as seen in FIG. 13 and FIG. 1 so that they are shown at the appropriate times. The material on each of the segments 211–220 may, for example, be typing, printed words, writing, or color photography.

AVIT may be programmed by a professional programmer, by a teacher making his own program, by a teacher modifying or adding items to an existing program, or by a student setting the machine up to assist him in memorizing some special set of material. In any case, the programming is concerned with the material to be taught and takes no account of the student or the teacher's methods of utilizing the machine. There are at least three additional types of programming the machine may accept to fit the behavior of the teaching machine of the present invention to the needs of the student and the teacher.

AVIT programs the greeting card which is made on the teaching machine in much the same way as the teaching cards, whose programming was described above. The "greeting card" greets the student by name either acoustically, by visual output or some combination of the two. Once the greeting has occurred, there is no answer associated with it unless the teacher is using an access code to the material to be taught. When the student first switches the machine on, this card greets him by name, i.e., it says his name. In case the student has been given the wrong cassette, this greeting will not only warn him that he has the wrong material, but also serves as a positive reinforcing agent when he does get the correct cassette. The greeting card may also contain the student options, i.e., it may be the student option input mechanism. To program this card, a different set of control options are used. As one of the most common situations concerning this card will be its modification, as information concerning a student's learning and development pattern grows, this process will largely be one of first reading the contents of the card and then modifying them. To implement this particular need the card if first drawn from the reserve stack, read and placed in the display position 200. The options are then displayed on command through the symbol display 205. If the programmer wishes, he may modify the values read back. When he is satisfied with the information in the machine he then activates another option through a control character and the card is returned to the active stack 51h rather than going to the reject 50b. It is immediately re-picked, since no other cards are in the active stack as specified above for this mode, and, as it again goes to the display position it is re-recorded with the modified set of options and finally sent to the reject stack 50b.

Updating the student option record, whether it be by the manetic process just described or through one of the other option carrying mechanisms described above, again leads to learning by the total system about the options needed by a particular student. As complaints arise about the machine's behavior, that behavior is modified through this process to be more in keeping with the needs of the student. Thus again, future behavior is modified on the basis of past experience, the definition of learning used here. Thus the machine system "learns" to optimally match itself to the student's needs over a long period of time.

The Teacher Option Cards are programmed in precisely the same fashion, the only difference being in the codes used.

It should be noted that in alternative embodiments of the teaching machine a teacher's switch panel 32 may replace this card programming system. Also, both teacher and student options may be entered with pencil and paper, making use of the optically read card 206 of FIG. 12 which was discussed above under "An Optical Card". It should be noticed that any choice which is possible for machine behavior can be controlled by an option assigned either to the student or the teacher. The difference between the two is a matter of coding on either the optical or magnetic reading systems.

The Student Options may be adjusted to personalize the machine's reactions to fit the individual student. Preferably this memory is non-volatile in case of power failure and associated with the cassette, or at least with the card stacks which are associated with the student. In one embodiment of the present invention the "student option memory" is a set of slidable magnetic pegs in the base of the cassette structure with detents to hold the magnetic pegs in the correct positions, or it may be a set of hidden switches on the machine, or it may be the optical or magnetic card reading systems described above and shown in FIGS. 12 and 13 respectively. If the peg and magnet system is used, various student options are set by sliding these magnet pegs to the desired positions with the aid of a sharp object such as a pencil, or by setting the switches. When pegs are used, the resulting magnetic pattern is read by a matrix of reed switches in the housing of the teaching machine. The student option memory provides data which interacts with the information from the individual cards as inputs to the learning and timing algorithms. These algorithms are based upon such data as the relative reaction speed of the individual student (relative to other students) and the relative learning ability of the student (relative to other students). In the algorithm the numbers (provided, for instance, by magnetic peg locations) representing these ratios affect (a) the speeds with which the machine interacts with the student in various portions of its cycle (the time provided for the student to answer each question but modified by the immediate previous history of interaction with that question); and (b) the degree of repetition (the number of times each question is asked before the machine acknowledges that a particular item is known by the student). Different timings are available for the student for various portions of the machine's operations so as to personalize it to the individual student. In addition, other functions may be chosen by the student options, i.e., by the magnetic peg settings or by the optical card mark or by the card. For example, the "repeat option", when activated, causes the machine to revert to the beginning of a question once a student has made a mistake and to ask the student to try again while the machine shows the correct answer. If this "repeat option" is not activated, the machine simply goes ahead to the next item without pausing to go back and show the right answer for more than a short glance for reinforcement purposes, but not long enough for the pupil to try entering the answer again on the input keyboard.

The Teacher Options control the behavior of the machine either of a general nature, or specifically to do with the teacher's preferences. The controls, as mentioned above, may be of one of three types, namely the switch panel 32, the optical card 206, or the normal magnetic card 210.

These options control any interaction of the machine with an outside system. Connection with a computer, use of sentic, galvanic skin response, or electroencephalographic information, control of outside systems, such as the central telephone equipment suggested above, are all switched on through teacher option choices. Such choices activate jumps in the microprocessor 130 programs. In addition, the internal behavior of the machine can be controlled in the following ways: The data output of the machine may be controlled so that only such output data is delivered as the teacher wishes to use and no additional and unwanted data is generated. For instance, cards may be automatically pencil marked 27, 28 by the machine to indicate student problems but, if the teacher does not wish to use such data, it may be suppressed so that no hand-erasing of the cards is required of the teacher.

Figure 11:
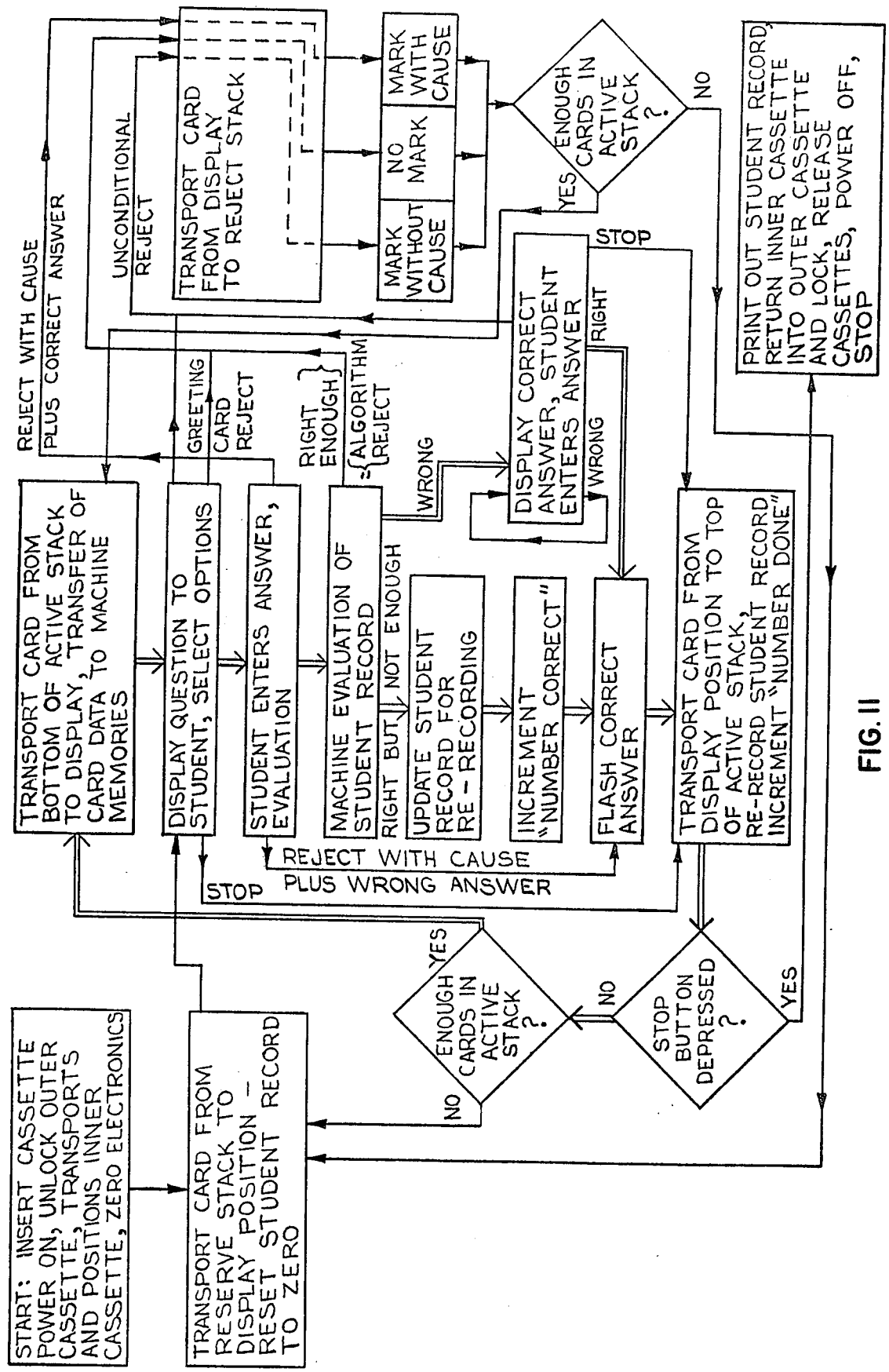
FIG. 11 is a simplified flow diagram for one mode of machine operation in the teach mode in which the matrix window is not utilized for the sake of simplicity of the drawing.

The Teach Mode Flow Diagram of FIG. 11 is a simplified flow diagram of the functioning of the teaching machine of the present invention when only one item is placed on an individual card 210 and corresponding thereto only one or at most a few of the segments of the card 211 through 220 are used to present a single concealed response. We will consider this simplified situation first to exemplify the machine's basic behavior, then return to the consideration of the modifications necessary when the matrix display window and the Hint Presentation system are utilized. In this description we choose a single specific pattern of a large number of alternative flow patterns which can be selected by the student option memory (94, 95, 96 or 210 or 206). The double arrows show the main cyclical path which the machine goes through in a normal presentation to the student when the active stack already has as many cards in it as the student option memory calls for.

A card is delivered to the display position 200, loading the machine memories, starting the acoustic output (loop 47) and turning on the "Enter" lamp 116. The student has eight basic ways he can interact with the machine, depending on whether he presses one of the seven buttons or starts typing. These choices are exemplified by the button functions which are: Reject 21, "I know this" 22, correction 42, replay audio 45, stop session 100, "Show Error" 120, and "Hint Please" 121. The stop session button 100 and the reject buttons 21 and 22 would be the unusual choices and would switch the machine off of the main double arrow path of FIG. 11, so we will exclude them for the moment. The normal choice is to use the keyboard 12 to input an answer in response to the question asked by some combination of verbal output from the tape loop and the visual display 17 and symbol display output 205. The student's last act in entering the answer is to pull the handle 15, which switches off the "Enter" lamp 116.

Assuming he answers incorrectly, the control circuit 108, 109 first evaluates his answer as incorrect, then makes display 17 transparent in order to show the correct answer, which is written on the card face, then lights the "Enter" lamp 116 (which lamp 116 appears to stay lit as the above evaluative processes are very fast). The correct answer was written on one or more of the segments 211–220 of card 210, and corresponding segments of the liquid crystal window became transparent to show that answer. The student now tried to enter the correct answer while seeing it displayed before him. If he makes another mistake, the system starts over again until he either does the item correctly without assistance or strikes the "Show Error" button 120, after which the "wrong" lamp 118 will light at the moment the first wrong key is pressed, pointing out the error. Alternatively, the student may use the replay audio button 45 to re-hear the acoustic message, or the "hint please" button 121 to obtain a hint as to what is correct, although this latter is generally used before the first incorrect response is registered, since after that the correct answer is being displayed. Alternately, if he is unable to give the correct response with these assists, then an escape is provided through the "reject" button 21 or the "stop session" button 100 whose functions will be discussed below. When a correct answer has finally been given, the control circuit shows the correct answer visually, increments the "Total Questions Done" display 19*b*, and transports the card back to the active stack while replacing the same student record on the card that it received as the card came in, possibly with modifications. Since we have assumed that the "stop session" button 100 has not been pressed, and the active stack has enough cards in it, the next action is to pick another card from the active stack and transfer it to the display position while transferring the new card's data to the machine memories. The process has thus come full cycle, and another question is being presented to the student, as at that point where we started.

Let us now assume that the student reacts in the same fashion as before to this new card. He goes through the processing with this card, initially giving a wrong answer and eventually ending by giving a correct answer after the correct answer is shown by the display 17. Again a new card is picked and he repeats the same process again. This would be the expected behavior for a sutdent interacting with questions he does not know. After he has cycled through the entire set of cards in the active stack a few times, so that he has attempted to answer each card several times, he can be expected to have learned some items enough to be able to give an answer correctly when the card first appears. Note that up to this point no correct answers have been recorded in the student record, so that if the record was zero to start with, it is still zero. Further, each card was counted and the "done" counter now contains the number of cards processed, but none have been counted as correct so far.

The student finally gets the answer correct on his first try and at this point the answer evaluator 108 modifies the student record in memory locations 113 to so note. The normal processing of cards goes on with the student record being continually updated and eventually the learning algorithm recognizes the card as learned at which point it is rejected to the reject stack 50*b* as explained under "learning algorithm" above.

The possibility of a reject without the student having learned the card, either because he knew it previously or because he was unable to learn it for some reason, has been discussed above under "reject button" and "I know this or reject with cause button". The "correction button" was also discussed above.

The start-up of the machine in teaching mode occurs when the student inserts his cassette which compresses springs and allows mechanical catches (no shown) to grip and hold the outer cassette. This mechanical grasping of the outer cassette turns on and holds the power switch on. The inner cassette is then unlocked mechanically from the outer cassette, transported into position inside the machine to the position it is shown in in FIGS. 4 and 5, and the electronic system cleared. A card is first picked from the reserve stack 52*b*, see FIG. 11. That first card, if correctly put in the cassette by the teacher, is the special "Greeting Card" which indicates to the machine in its coding that it should be rejected as soon as it has served its purpose and that there should be no wait for actions by the student. The card thus goes to the reject stack 50*b* and, if the cassette was prepared with an empty active stack, as would be the situation if a student was starting a new deck, then too few cards will be in the active stack to satisfy the active stack card level detector 33, so a card will be picked from the reserve stack. As this process goes on, more and more cards will be taken from the reserve and placed in the active stack until the predetermined level of cards in the active stack is reached, at which point the next card will be drawn from the active stack and the machine is in its normal cycling mode discussed above.

When the student wishes to stop his session with the machine, he pushes the "stop session button" 100. The machine immediately transports that card to the top of the active stack after re-recording the student record and does not increment the "number done" display. As the decision point is reached concerning the stop button condition, the machine is diverted to the special turn-off path. First the three numbers describing the student's score, namely, the "time elapsed", "questions done" and "questions correct", are printed out onto a special sheet carried by the inner cassette on its top 97, as seen in FIG. 8. This sheet will become a permanent printed record for the teacher. Next, the inner cassette, along with this record, is returned to the outer cassette and the two locked together. The springs which had originally been compressed when the cassette was loaded then push the cassette out of the machine as the mechanical locks holding the outer cassette down are released. The physical motion of the outer cassette then turns off the power.

Teach Mode using the Matrix Display Window is much like the teach mode considered above with a single question and a single correct answer on an individual card, as we considered it in the summary and in the discussion of programming. We now turn to the use of the multi-segment window display 17 shown in FIG. 1. Preferably the window is a liquid crystal electro-optical device having segments (windows), for example, rectangular areas, which are separately connected (wired using lines of transparent conductive plating on glass, such as tin oxide lines) and which may be separately activated to become transparent or opaque. Such windows can be supplied by the International Liquid Crystal Company of 26101 Miles Road, Cleveland, Ohio. Their function depends upon a liquid crystal sandwiched between crossed polarizers, the liquid crystal, when activated electrically, repolarizing the light coming through one polarizer so that it can go through the other.

The problem to be presented to the student may now be broken up into a series of sequential or random ordered segments, all of which are on one card, FIG. 13, as mentioned in the summary, and each of which may be treated as a separate question which is, however, correlated with the problem as a whole. The location of the printed or pictorial material on the cards must coincide with the location of the separate "windows" so that the control circuit can open or close the appropriate window segment in front of the material to be displayed (see also Internal Information Transfer and The Matrix Window And Its Control System). The order of such opening or closing is controlled in the programming. For example, a question might be a question in engineering in which the segment of the display 17 covering card location 211 of card 210 is made transparent immediately on the entry of the card. Segment 211 presents the entire problem, i.e., the problem is written on the segment 211 of the card and the window 17 in front of it (a portion of 19a, FIG. 1) is open so that written material can be seen. The first step in solving the problem is to be entered into the keyboard 12 by the student. The correct answer will be visibly written in location 216 of card 210 which can be made visible to the student by making the corresponding segment of 18a of display 17 of FIG. 1 transparent, so that the correct answer can be seen, if so commanded by the timing and data distribution control 111 of the microprocessor 130. This segment would be opened, for instance, if the system had gone into the equivalent of the repeat mode indicated in FIG. 11 by the box entitled "Display correct answer, student enters answer". The correct answer data will have been transferred to the programmed data portion 112 of the coded data storage 110 of the mcroprocessor system 130 as described under "AVIT's Internal Information Transfer". This data is used, together with the answer evaluator 109 tegether with the evaluative rules, in the same memory area 112 of coded data storage 110 of microporocessor system 130 to decide on advance to the next learning segment according to the orders of the programmer which these rules represent.

A process exactly analogus to that described under "Teach Mode Flow Diagram of FIG. 11" then ensues, with a portion of the cycling which was carried out in that case through the use of the cards cycling in the active stack is here replaced by transfer of visibility of the card from one segment to another by the segments of the matrix window without motion of the card. For example, after segments 211 and 216 of the card have been used as above, then segment 212 could be used for the answer to the next portion of the problem, the problem itself having been presented in segment 211 initially. Alternatively, segments 212 and 217 might be utilized together for a related question-answer subproblem. After all of the segments necessary to the problem under consideration have been gone through, including as many as are necessary of 212, 213, 214, 215, 217, 218, 219, 220, i.e., after the sequential teaching of all of the steps for the problem have been completed, the card itself will finally be returned to the active stack and another card called. Thus a series of items are kept together and taught in a psychologically equivalent fashion to the technique used by AVIT described above, but, instead of sorting cards, the manipulations are entirely those of electrically controlling the opacity or transparency of portions of the display 17 as described above. Eventually the same card returns to the display position 200 and is again processed with the difference that a set of student records for each step of the problem are present rather than a single one. This in turn requires additional complexity in the learning algorithm to either skip portions of the segments as they are recognized as known, or make an averaging type of judgment on card reject, dependent on the desires of the programmer, as such flexibility is available by the the nature of microprocessor controlled systems.

In the above fashion an entire problem can be handled which requires a specific order to the problem steps. Such a response would be impractical by the normal card sorting process alone, since the cards would have to be put in the proper order by the instructor before they could be used by the student. The cards would normally not retain any order in the reject stack because the random order of the rejects by a previous student would have destroyed any pre-existing order. If the group of cards is to be used over, and requires a specific order, the teacher would have to sort it out, which is a time-consuming process, and thus far too expensive. In the case of the liquid crystal display 17 operating on a single card, however, the various elements of the problem are all associated physically on the card and the switching from one segment to another is simple to arrange as it is entirely electronic. Further, there is a limited number of possibilities to be considered so that the memory capacity to control the switching, which memory capacity is carried on the card and transferred to the machine memory, is not excessive. At the same time the entire process is organized on one card so, when the process is finished, the entire mass of associated items are rejected as a single unit (card).

Another type of problem might be the presentation of a French irregular verb and, after the original word is identified, various forms associated with different conditions of the surrounding portions of the language would be considered as special problems, each requiring one or more segments of the display. In this fashion, associated material can be taught as a unit rather than being distributed temporally through the learning process, as is the usual situation in the foreign language classroom.

MODIFICATIONS AND APPLICATIONS OF THE INVENTION

Modifications may be made in the present invention within the scope of the subjoined claims. Some of the modifications are as follows:

1. An electrostatic rather than a vacuum picker system 101, 102, 103, 25, 26 may be used in which the picker tongues 25, 26 FIG. 9, consist of plastic sandwiches which contain a metallized interdigital structure across the terminals of which a high voltage is placed to cause the cards to stick to the picker while they are being picked, in place of the vacuum system 103, 26, 102, 25 described above. Such a system of paper gripping is used in the Hewlett-Packard Model 7200A graphic plotter to hold down the paper being drawn on.

2. Human beings use a selection mechanism in choosing a single item from a long list, such as choice of a home, or choice of an individual to fill a job from a number of applicants. This process is comparable to AVIT's normal behavior pattern. Thus AVIT can be used to facilitate such selections. The same physical structure is used so far as card stacks 50b, 51b, 52b and shuffling (FIGS. 4, 5) is concerned, but the microprogram in the control system is different. The evaluative functions relating to the keyboard inputs are not necessary. An example is the case of selling houses. Each card describes one possible house, which may include a photograph printed on the card. Such a photograph may be supplied by means of a color printing process such as that supplied by the XEROX Model 6500 color copier. The potential buyer would then examine this information by observing the cards in the usual manner. As individual possibilities are elminated from the active stack 51h by the reaction of the user (which he implements by activating the reject button 21), a flow of cards from the reserve stack 52b goes through repeated examination in the active stack 51h cycling process, and then to the reject stack 50b. As more and more cards are rejected, the entire reserve stack 52b would have gone through this process and those remaining in the active stack 51b are the distillation of those items of interest, being a relatively small number. These would be cycled in the usual manner except that a rejected card would not be replaced from the reserve stack 52b. Thus the number of cards in the active stack 51h continuously decreases until there are few enough so that the remaining items require personal examination by the potential buyer.

The same type of choice process can be used for other items such as liquors, suits, etc.

3. An addition to the use as described under (2) above is to have the keyboard 12 connected so that the prospective buyer can comment to himself on individual items, so that he can remember his reaction, from the last time through, to a particular item. These comments may also be most useful to the prospective seller where only one or a smaller number of the characteristics of the item being considered are in question. For instance, a house might be a possibility if the price were lower, and the porch screened, so the user comments to this effect using the keyboard 12. When his use is finished, the cards could again be run through the machine from reserve stack 52b to reject stack 50b by the salesman, where the results could be fed to a computer line through connector 31 and the collected final comments assembled for possible action by the sellers of the homes commented on. Such a mechanism would be advantageous for the seller in that it would provide feedback concerning the problems he is having selling his property, and provide specific suggestions for how he could make the property more salable. Further, it might give him the opportunity to make a sale under conditions slightly different from those he had originally set up.

4. A refinement of the machine, for the use as proposed in (2) above, is to have a multi-card presentation of a complex item being sold where each item (card 210) has both an identification number on the digital data track 208 and a second number also on 208 indicating the number of cards associated with that item. Under these conditions the machine can reject immediately the number of cards utilized in the presentation of the item, and having the same code number. When a reject occurs to stack 51b, the microprocessor 130 then introduces another set of cards (from the reverse stack 52b) associated with another item, with the number of cards (in the set to be drawn from the reverse stack 52b which carry this item) is carried by the first card of this set and thus sets up the memory locations 112 of coded data storage 110 of microprocessor 130 to accept the proper number of cards from the reverse stack 52b rather than the active stack 51h. Thereafter the next card would in the normal pattern be picked again from the active stack 51h.

5. A refinement of the machine's interaction with the user in the teaching context may be made by taking into account the momentary mental condition of the user. If the user is highly motivated and is paying close attention to the machine, his learning will be more effective. Information concerning the state of attention of the student could thus be usefully employed in the interpretation of the learning process through the learning algorithm. The addition of a brain wave sensing system capable of detecting his state of consciousness can supply this information through connectors 31 to the learning algorithm. Such systems may be obtained from the Edmunds Scientific Co. of Barrington, N.J., as models 1635, 1652, 71809, 42194, 1655, 156 and 19199. A correlation exists between the frequency ranges of the brain waves detected by these instruments and the state of consciousness of the individual. Such inputs to the learning algorithm through connection 31 (mentioned above) can adjust the number of repeats required for recognition that the item being studied has been learned. (see "Answer responses come from outside the machine")

Other sensing systems for physiologic data representative of emotional states are known, such as the galvanic skin response in which the resistance of the skin changes under emotional stress. In addition, Sentic sensing systems have been built, capable of distinguishing some seven basic emotions. Apparatus for such sensing whose output may be fed to the machine of the present invention through plug 31 for input into the learning algorithm is described in: Sentics: the touch of emotions — Manfred Clynes, Doubleday, or "The biological basis for sharing emotion — the pure pulse of Musical Genius"— Manfred Clynes — Psychology Today, July 1974, pp. 51–55.

6. In addition, feedback of the information obtained with the apparatus described in (5) to the student by means of a display indicating the kind of brain waves present can assist the student in achieving that state of concentration in which his learning rate is greatest, as it does in all biofeedback systems.

7. The reject 50b and reverse 52b stacks may be replaced by a single stack from the bottom of which reserve cards are picked and into the top of which reject cards are discarded. A specially marked card can be used to indicate the dividing line between the rejected and reserve cards; and, since the reserve stack 52b will be full and the reject stack empty at first, and at the end of a session there will be some cards in the reject stack 50b, with fewer cards in the reserve stack 52b, such an arrangement is more efficient of cassette space but requires either track crossings for the cards or a double length cassette.

8. The card marker 27, 28 is utilized to indicate three different situations leading to rejection of a card, namely: algorithm reject, unconditional reject, and reject with cause. Such marking may alternatively be replaced by having three reject stacks for the three types of cards, with a card switch directing the cards into the appropriate one of the three different paths.

I claim:

1. A teaching machine including a housing, a display fixed on said housing, an operable means for the input of data;
   a plurality of cards positioned within said housing each of which cards has data thereon, the data being a question or concept and information related to said question or concept;
   mechanical means within said housing to sort said cards, including a first stacking means to position cards on the top of an active stack, a second stacking means to stack cards into a reserve stack, and a third stacking means to stack cards into a discard stack;
   display position means to position said cards in a display position associated with said display;
   operable means for the input of data by the student in response to stimuli generated by the machine;
   picker means to remove cards from the bottom of the active stack or alternatively from the reserve stack;
   a first conveyor means to transport said cards from either the reserve stack or alternatively the active stack to said display position means;
   a second conveyor means to transport cards from said display position to either the first stacking means to be placed back in the active stack in the case of an incomplete or wrong answer or an answer which is as yet insufficiently learned or alternatively to the third stacking means to be placed in the discard stack in the case of a correct answer or an answer which has been adequately learned; and
   recording means to record machine readable question or concept related data and/or student record data on the cards sufficient to indicate if the question or concept has been correctly or incorrectly answered or responded to and to indicate the state of the user or student's knowledge concerning the question or concept.

2. A machine as in claim 1 and further including an electronic control circuit connected to and controlling said first and second conveyor means and being responsive to said operable means.

3. A machine as in claim 2 and further including a control circuit responsive to said data on said cards.

4. A teaching machine as in claim 3 and further including a secondary display indicating to the student one or more from the group consisting of the following: the total number of questions done during each session of usage; the total number of questions done correctly during each session; and the total elapsed time during selected machine modes.

5. A teaching machine as in claim 4 wherein said secondary displays may be made visible and at other times are concealed under control of the control circuit.

6. A teaching machine as in claim 4 and having printing means wherein each of said group may be printed out to serve as a record of total student performance.

7. A teaching machine as in claim 2 and further including a set of electrodes adapted to be connected to the head of the user and an encephalograph amplifier connected to said electrodes; a frequency decoder capable of distinguishing which frequency range of brain wave is present and generating a code to so indicate, said code being connected to said control circuit.

8. A teaching machine as in claim 2 and further including a magnetic write head connected to said operable input means whereby the cards may be programmed by a programmer.

9. A teaching machine as in claim 2 wherein said second conveyor means conveys cards to the third stacking means and thereby to said discard stack only when the card in question has been correctly answered the number of times selected.

10. A teaching machine as in claim 9 and further including a first reject switch whose operation overrides the operation of said control system and causes the card involved to by transferred directly to said discard stack.

11. A teaching machine as in claim 10 and further including a marking mechanism to mark cards going to the discard stack.

12. A teaching machine as in claim 10 and further including a first reject discard stack into which the cards are directed when said first reject switch is activated.

13. A teaching machine as in claim 10 and further including a second reject switch conditionally overrides said control circuit when said second reject switch is activated before a correct answer has been entered at said operable means, under which conditions said card is moved to said discard stack.

14. A teaching machine as in claim 13 and further including a marking mechanism to mark cards going to said discard stack, position of said mark being so chosen as to indicate that said second reject switch was activated in addition to there being present a correct answer from said operable means which combination led to card's direction to said discard stack.

15. A teaching machine as in claim 13 and further including a second reject discard stack into which the cards are directed when said second reject switch is activated and followed by the input at the operable means of a correct answer.

16. A machine as in claim 1 and further including machine means to read the question related data on the cards.

17. A machine as in claim 16 and further including means to enter the question related data on the cards, wherein the question related data is writable and eraseable on the cards by the machine.

18. A machine as in claim 1 and wherein the display is an electro-optic display whose transparency is controlled electrically.

19. A machine as in claim 18 and further including a control circuit connected to and controlling said display's transparency and responsive to said operable means and said card data.

20. A machine as in claim 1 wherein the cards have thereon magnetizable material for the said question data.

21. A machine as in claim 1 and having a magnetic reading head to read data from cards.

22. A machine as in claim 21 and having a data storage device connected to said reading head to store data from cards for later use.

23. A machine as in claim 21 and having an acoustic output device such as a loudspeaker or earphone connected to said storage device for replay of acoustic data.

24. A machine as in claim 1 and further having a magnetic recording head and connected thereto a data storage device to enter student performance data upon said cards.

25. A machine as in claim 24 and further including a magnetic reading head positioned near said display position, said reading head being connected to said data storage device.

26. A teaching machine as in claim 1 and further including a control circuit connected to said operable means and receiving input from said operable means and from said card carried data, which control circuit evaluates input data from said operable means and said card carried data and is connected to and controls said first and second conveyor means and is responsive to one or more of the group consisting of:
a user control through which user's momentary mood as he perceives it is inputted;
a student performance data record;
first input means by which machine's second conveyor means may be controlled to determine the number of times an answer must be correct before the card is conveyed to said third stacking means; and
input means by which the type of information fed back to the teacher may be predetermined.

27. A teaching machine as in claim 26 wherein the first input means is a card having magnetizable areas which can be read by a magnetic reading head and the data stored in a data storage device wherein said card's data is separated from said student performance data by said control circuit on the basis of identification of card of this claim as different from other cards.

28. A teaching machine as in claim 26 wherein said first input means is an adjustable set of pegs on the surface of an object inserted in said machine, which pegs cooperate with switches fixed relative to the housing.

29. A teaching machine as in claim 28 wherein the pegs are permanent magnets and the switches are reed switches.

30. A teaching machine as in claim 29 wherein the pegs are selectively slideable in channels in said surface.

31. A machine as in claim 26 wherein said first input means includes an optical mark sensor system to read data from optically marked cards.

32. A machine as in claim 31 and also having a data distribution device and a data storage device such that the location of the data to be stored and the data itself are both read from said optical card by said sensor system.

33. A teaching machine as in claim 1 wherein said operable means further includes means for the input of data by the programmer of data related to format and presentation procedure during the programming procedure.

34. A teaching machine as in claim 1 including a housing, a device requiring physical output from the user and having physical movement and movably mounted on said housing, switch means connected to said device, a machine control system connected to the switch means so that the activation of the device completes an answer response and causes a new response to be brought into view by the display position means.

35. A teaching machine as in claim 34 wherein the force required to activate said device is adjustable and is a programmable means which is connected to such adjustment means to control the adjustment of said force.

36. A teaching machine as in claim 34 wherein the force adjustment means comprises a motor having an output shaft, a gear attached to said shaft, a rotatable wheel driven by said gear, a connection linkage pivotly mounted on said wheel, and a spring having one end attached to said linkage and its opposite end attached to said handle.

37. A teaching machine as in claim 35 wherein the programmable means is a card having magnetizable areas, the control system is a numerical control system responsive to magnetization of said areas, and the adjustment means is an electro-mechanical transducer.

38. A teaching machine including a housing, a cassette loaded with a plurality of cards, the cards having indicia thereon for questions or other data, a machine control system, correct answer evaluation means connected to said machine control system, a first input means connected to said answer evaluation means, a card transport system controlled by said control system, means to record on each card data and constituting the student record concerning one or more of the following: (a) the number of times including more than once the question on the card has been answered correctly; (b) the number of times including more than once the question on the card has been answered incorrectly; (c) the responses to the question on the card; (d) the order of responses to the question on the card; reading means to read the said student record on each card, said reading means being connected to said control system so that the control system may control the card into different movements depending upon said number of times the question on the card is correctly or incorrectly answered and said other items of the said student record.

39. A teaching machine as in claim 38 and further including one or more from the group of:
a user control through which the user's momentary mood as he perceives it may be inputted;

a second input means by which the type of information fed from the machine to the teacher may be predetermined;

a sensor and memory for said cassette's insertion and the number of cards processed since that insertion.

40. A teaching machine as in claim 38 wherein within the cassette there is an active stack and a discard stack, the cards being moved to said discard stack only when correctly answered the number of times selected.

41. A teaching machine as in claim 40 and further including a first reject switch whose operation overrides operator of said control system and causes the card involved to be transported directly to said discard stack.

42. A teaching machine as in claim 41 and further including a second reject switch which conditionally overrides said control system when said second reject switch is activated before a correct answer is applied at the first input means, under which conditions the card is moved to said discard stack.

43. A teaching machine as in claim 41 and further including a marking mechanism to mark cards going to said discard stack indicating by the position of the mark on the card being rejected that said first reject switch was activated.

44. A teaching machine as in claim 42 and further including a marking mechanism to mark cards going to the said discard stack, indicating by the position of the mark on the card being rejected that said second reject switch was activated and followed by the input at the said first input means of a correct answer.

45. A teaching machine as in claim 41 and further including a first reject discard stack into which the cards are directed when said first reject switch is activated.

46. A teaching machine as in claim 42 and further including a second reject discard stack into which the cards are directed when said second reject switch is activated and followed by the input at the first input means of a correct answer.

47. A teaching machine as in claim 38 and further including a second input means which is an adjustable set of pegs on said cassette, which pegs cooperate with switches fixed relative to the housing.

48. A teaching machine as in claim 47 wherein the pegs are permanent magnets and the switches are reed switches.

49. A teaching machine as in claim 47 wherein the pegs are selectively slidable in a channel.

50. A teaching machine including
a housing having a display thereon;
an operable means for the input of data;
a plurality of cards positioned with said housing each of which cards has data thereon, the data being either a question and information related to said question or data to which the user is to react otherwise;
mechanical means within said housing to sort said cards including first stacking means to position cards back into an active stack, a second stacking means to stack cards into a reserve stack, a third stacking means to stack cards into a discard stack;
means to position said cards in a display position associated with said display;
picker means to remove cards from the bottom of the active stack or alternatively from the reserve stack;
a first conveyor means to transport said cards from one of the reserve stack or the active stack to said position means;
a second conveyor means to transport cards from said display position to one of the first stacking means to be positioned back in the active stack in the case of an incomplete or insufficiently repeated or wrong answer or alternatively to the third stacking means to be positioned in the discard stack in the case of a correct answer or other response accepted for this action;
an electronic control circuit connected to and controlling said first and second conveyor means and being responsive to said operable means and responsive to said data on said cards; and
keyboard means for the input by the student or programmer of answers to questions and for the input of programmer's question related data during the programming process.

51. A teaching machine as in claim 50 and further including recording means to record machine readable data on the cards indicating if the user has placed information on the card or otherwise responded to it.

52. A teaching machine as in claim 50 and further including within the operable means a reject button which causes a card in said display position to be conveyed by said second conveyor means to the third stacking means and thus to the discard stack.

* * * * *